US012679918B2

(12) United States Patent
Park et al.

(10) Patent No.: US 12,679,918 B2
(45) Date of Patent: Jul. 14, 2026

(54) COPOLYMER FOR POLYMER ELECTROLYTE, AND GEL POLYMER ELECTROLYTE AND LITHIUM SECONDARY BATTERY WHICH INCLUDE THE SAME

(71) Applicant: LG ENERGY SOLUTION, LTD., Seoul (KR)

(72) Inventors: Sol Ji Park, Daejeon (KR); Jeong Ae Yoon, Daejeon (KR); Kyoung Ho Ahn, Daejeon (KR); Su Jeong Kim, Daejeon (KR); Chul Haeng Lee, Daejeon (KR); Sung Soo Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1154 days.

(21) Appl. No.: 17/615,798

(22) PCT Filed: Aug. 7, 2020

(86) PCT No.: PCT/KR2020/010476
§ 371 (c)(1),
(2) Date: Dec. 1, 2021

(87) PCT Pub. No.: WO2021/025521
PCT Pub. Date: Feb. 11, 2021

(65) Prior Publication Data

US 2022/0340702 A1 Oct. 27, 2022

(30) Foreign Application Priority Data

Aug. 8, 2019 (KR) ........................ 10-2019-0096997

(51) Int. Cl.

| | |
|---|---|
| ***C08F 259/08*** | (2006.01) |
| ***C08K 3/04*** | (2006.01) |
| ***C08K 3/18*** | (2006.01) |
| ***C08K 3/32*** | (2006.01) |
| ***C08K 5/109*** | (2006.01) |
| ***H01M 10/052*** | (2010.01) |
| ***H01M 10/0565*** | (2010.01) |

(52) U.S. Cl.
CPC .............. *C08F 259/08* (2013.01); *C08K 3/04* (2013.01); *C08K 3/18* (2013.01); *C08K 3/32* (2013.01); *C08K 5/109* (2013.01); *H01M 10/052* (2013.01); *H01M 10/0565* (2013.01)

(58) Field of Classification Search
CPC ........................ C08F 259/08; H01M 10/0565; H01M 8/1039
See application file for complete search history.

(56) References Cited

U.S. PATENT DOCUMENTS

| | | | | |
|---|---|---|---|---|
| 5,880,204 | A | 3/1999 | McCarthy et al. | |
| 5,900,183 | A * | 5/1999 | Kronfli | C08F 259/08 429/316 |
| 6,037,080 | A * | 3/2000 | Kronfli | H01M 4/13 429/188 |
| 6,140,408 | A | 10/2000 | McCarthy et al. | |
| 6,235,433 | B1 | 5/2001 | Amano et al. | |
| 9,634,309 | B2 * | 4/2017 | Park | H01M 50/446 |
| 2002/0061448 | A1 | 5/2002 | Morigaki et al. | |
| 2003/0082458 | A1 | 5/2003 | Oyama | |
| 2007/0111104 | A1 | 5/2007 | Shibuya | |
| 2010/0010164 | A1 | 1/2010 | Tanaka et al. | |
| 2012/0107726 | A1 | 5/2012 | Ogata et al. | |
| 2014/0315080 | A1 | 10/2014 | Abusleme et al. | |
| 2015/0080524 | A1 | 3/2015 | Yoon et al. | |
| 2017/0015772 | A1 | 1/2017 | Watanabe et al. | |
| 2017/0040632 | A1 | 2/2017 | Ogata et al. | |
| 2018/0342767 | A1 | 11/2018 | Ahn et al. | |

(Continued)

FOREIGN PATENT DOCUMENTS

| | | | |
|---|---|---|---|
| CN | 101589079 | A | 11/2009 |
| CN | 103387642 | A | 11/2013 |
| CN | 104334593 | A | 2/2015 |

(Continued)

OTHER PUBLICATIONS

Zhang (Graft Copolymers from Poly(vinylidene fluoride-co-chlorotrifluoroethylene) via Atom Transfer Radical Polymerization, Macromolecules, 2006, 39, pp. 3531-3539).*
Machine translation of JP-2014049416-A (2014, 18 pages).*
Machine translation of KR-20010100242-A (2001, 12 pages).*
Machine translation of RU 2218359 (2003, 5 pages).*
Machine translation of RU 2430934 (2011, 3 pages).*
Machine translation of JP 2017-115102 (2017, 22 pages).*
Office Action issued in Chinese patent application 202080041016.0 dated Feb. 20, 2024.
Zhang et al., "Graft Copolymers from Poly(vinylidene fluoride-co-chlorotrifluoroethylene) via Atom Transfer Radical Polymerization," Macromolecules, vol. 39, pp. 3531-3539, 2006.

(Continued)

*Primary Examiner* — Brieann R Johnston
(74) *Attorney, Agent, or Firm* — Morgan, Lewis & Bockius LLP

(57) ABSTRACT

The present invention discloses a copolymer for a polymer electrolyte, and a gel polymer electrolyte and a lithium secondary battery which include the same. Specifically, the present invention discloses a copolymer for a polymer electrolyte, which includes (A) a fluorine-based polymer, and (B) a unit derived from an acrylate-based monomer or an acrylate-based polymer, wherein the unit derived from the acrylate-based monomer or the acrylate-based polymer is grafted on the fluorine-based polymer, and a weight ratio of the fluorine-based polymer to the unit derived from the acrylate-based monomer or the acrylate-based polymer is in a range of 1:99 to 40:60, and a gel polymer electrolyte in which lithium ion transfer capability is improved by including the same. Also, the present invention may prepare a lithium secondary battery in which high-temperature safety is improved by including the gel polymer electrolyte.

13 Claims, No Drawings

(56) References Cited

U.S. PATENT DOCUMENTS

| | | | |
|---|---|---|---|
| 2020/0212484 | A1 | 7/2020 | Kwon et al. |

FOREIGN PATENT DOCUMENTS

| | | | | | |
|---|---|---|---|---|---|
| CN | 105985496 | A | | 10/2016 | |
| CN | 107353370 | A | | 11/2017 | |
| CN | 108352569 | A | | 7/2018 | |
| CN | 108395503 | A | | 8/2018 | |
| EP | 3664210 | A1 | * | 6/2020 | .............. C08F 14/18 |
| JP | H11-185816 | A | | 7/1999 | |
| JP | H11-329064 | A | | 11/1999 | |
| JP | 2000-215917 | A | | 8/2000 | |
| JP | 2002-270236 | A | | 9/2002 | |
| JP | 2006-052362 | A | | 2/2006 | |
| JP | 4412840 | B2 | | 2/2010 | |
| JP | 2014049416 | A | * | 3/2014 | ........ H01M 10/0585 |
| JP | 2014-070113 | A | | 4/2014 | |
| JP | 2017115102 | A | * | 6/2017 | |
| KR | 10-2001-0006825 | A | | 1/2001 | |
| KR | 20010100242 | A | * | 11/2001 | ............ H01M 10/38 |
| KR | 10-0378349 | B1 | | 5/2003 | |
| KR | 10-2007-0051706 | A | | 5/2007 | |
| KR | 10-0796989 | B1 | | 1/2008 | |
| KR | 10-0796990 | B1 | | 1/2008 | |
| KR | 10-2012-0027176 | A | | 3/2012 | |
| KR | 10-2016-0114110 | A | | 10/2016 | |
| KR | 10-2018-0026358 | A | | 3/2018 | |
| KR | 10-2019-0030583 | A | | 3/2019 | |
| KR | 10-1981825 | B1 | | 5/2019 | |
| RU | 2218359 | C2 | * | 12/2003 | ........ H01M 10/0525 |
| RU | 2430934 | C2 | * | 10/2011 | |
| TW | 2019-04116 | A | | 1/2019 | |
| WO | 97/11979 | A1 | | 4/1997 | |
| WO | 2010/113971 | A1 | | 10/2010 | |
| WO | 2015/016330 | A1 | | 2/2015 | |
| WO | WO-2019054622 | A1 | * | 3/2019 | .............. C08F 14/18 |

OTHER PUBLICATIONS

International Search Report (with partial translation) and Written Opinion issued in corresponding International Patent Application No. PCT/KR2020/010476, dated Nov. 11, 2020.

Extended European Search Report dated May 30, 2022 issued by the European Patent Office in corresponding European Patent Application No. 20850323.5.

Hu et al., "Poly(vinylidene fluoride-co-chlorotrifluoroethylene) Modification via Organocatalyzed Atom Transfer Radical Polymerization," Macromolecular Rapid Communications, vol. 38, No. 21, p. 1700399 (2017).

* cited by examiner

COPOLYMER FOR POLYMER ELECTROLYTE, AND GEL POLYMER ELECTROLYTE AND LITHIUM SECONDARY BATTERY WHICH INCLUDE THE SAME

TECHNICAL FIELD

Cross-Reference to Related Applications

This application claims priority from Korean Patent Application No. 2019-0096997, filed on Aug. 8, 2019, the disclosure of which is incorporated by reference herein.

TECHNICAL FIELD

The present invention relates to a copolymer for a polymer electrolyte, and a gel polymer electrolyte and a lithium secondary battery which include the same.

BACKGROUND ART

Recently, there is a growing demand for high performance, high stability secondary batteries as electric, electronic, communication, and computer industries have rapidly developed. Particularly, in line with miniaturization and lightweight trends of electronic and communication devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

The lithium ion battery is advantageous in that it has high capacity, but the lithium ion battery is disadvantageous in that, since the liquid electrolyte containing a lithium salt is used, there is a risk of leakage and explosion and battery design is complicated to prepare for the risk.

In contrast, with respect to the lithium polymer battery, since a solid polymer electrolyte or a gel polymer electrolyte containing a liquid electrolyte solution is used as the electrolyte, stability is improved and, simultaneously, flexibility is obtained, and thus, the lithium polymer battery may be developed in various forms, for example, in the form of small or thin-film batteries.

A secondary battery, in which the gel polymer electrolyte is used, may be prepared by the following two methods.

First, after an electrolyte composition is prepared by mixing an oligomer or monomer polymerizable with a polymerization initiator in a liquid electrolyte solution in which an electrolyte salt is dissolved in a non-aqueous organic solvent, the electrolyte composition is injected into a battery accommodating an electrode assembly, and gelation (crosslinking) is performed under appropriate temperature and time conditions to prepare the secondary battery. However, with respect to the above method, since wetting in a cell is poor due to high viscosity and surface tension problem of the solution before the injection, it is disadvantageous in that mechanical strength is not easily secured even after the gelation.

As another method, after one surface of one of an electrode and a separator is coated with the electrolyte composition and curing (gelation) is performed by using heat or ultraviolet (UV) light to form a gel polymer electrolyte, an electrode assembly is prepared by winding or stacking the electrode and/or the separator on which the gel polymer electrolyte is formed, the electrode assembly is inserted into a battery case, and the secondary battery may then be prepared by re-injecting a conventional liquid electrolyte solution thereinto.

However, this method requires a heat or UV irradiation process for gelation and has a limitation in that the gel-coated separator absorbs moisture to degrade performance and stability of the battery. Furthermore, since a polyethylene separator, which has been used as a conventional separator, has a high thermal shrinkage rate, a short circuit occurs between the positive electrode and the negative electrode when the temperature rises under abnormal conditions of use, and thus, the stability of the battery may be reduced.

Therefore, there is a need to develop a method which may secure mechanical strength and ion transfer capability and may simultaneously prepare a gel polymer electrolyte having improved safety against external impact.

PRIOR ART DOCUMENT

Korean Patent Application Laid-open Publication No. 2007-0051706

DISCLOSURE OF THE INVENTION

Technical Problem

An aspect of the present invention provides a copolymer for a polymer electrolyte in which a unit derived from an acrylate-based monomer or an acrylate-based polymer is grafted on a fluorine-based polymer.

Another aspect of the present invention provides a composition for a polymer electrolyte which includes the copolymer for a polymer electrolyte.

Another aspect of the present invention provides a gel polymer electrolyte which is prepared by polymerization of the composition for a polymer electrolyte.

Another aspect of the present invention provides a lithium secondary battery in which high-temperature stability is improved by including the gel polymer electrolyte for a secondary battery.

Technical Solution

According to an aspect of the present invention, there is provided a copolymer for a polymer electrolyte which includes: (A) a fluorine-based polymer and (B) a unit derived from an acrylate-based monomer or an acrylate-based polymer, wherein the unit derived from the acrylate-based monomer or the acrylate-based polymer is grafted on the fluorine-based polymer, and a weight ratio of the fluorine-based polymer to the unit derived from the acrylate-based monomer or the acrylate-based polymer is in a range of 1:99 to 40:60.

According to another aspect of the present invention, there is provided a composition for a polymer electrolyte which includes the copolymer for a polymer electrolyte, a non-aqueous electrolyte solution, and a polymerization initiator.

According to another aspect of the present invention, there is provided a gel polymer electrolyte for a secondary battery, which is prepared by thermal polymerization of the composition for a polymer electrolyte, and a lithium secondary battery including the same.

Advantageous Effects

According to the present invention, a copolymer for a polymer electrolyte, which does not cause internal resistance of an electrode and has improved solubility in an electrolyte solution, may be provided by grafting a unit derived from an acrylate-based monomer or acrylate-based polymer with low viscosity and excellent electrode wetting properties as a pendant group to a fluorine-based polymer, a main chain. Also, since the copolymer for a polymer electrolyte is included, a composition for a polymer electrolyte, which may form a stable solid electrolyte interface (SEI) on a surface of the electrode by not only facilitating radical scavenge by fluorine atoms but also by improving lithium ion transfer capability and wetting to the electrode, and a gel polymer electrolyte prepared therefrom may be provided. Furthermore, a lithium secondary battery having improved high-temperature stability may be prepared by including the gel polymer electrolyte.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The technical terms used in the present invention are used only for explaining a specific exemplary embodiment while not limiting the present invention. The terms of a singular form may include plural forms unless referred to the contrary. In the present invention, it will be further understood that the terms "include," "comprise," or "have" specify the presence of stated features, numbers, steps, processes, elements, components, or combinations thereof, but do not preclude the presence or addition of one or more other features, numbers, steps, processes, elements, components, or combinations thereof.

In the present specification, the expression "unit" or "repeating unit" denotes a basic monomer unit constituting a polymer.

Unless otherwise specified in the present invention, the expression "*" denotes the same or different atom or a portion connected between ends of a formula.

Also, a halogen element in the present specification includes a fluorine element.

A fluorine-based polymer used in a conventional polymer electrolyte is advantageous in that it has electrochemical stability even at a high voltage (5.0 V) when used in a lithium secondary battery and radical scavenge by a fluorine group is possible. Also, in a case in which the fluorine-based polymer is included as an additive in a liquid electrolyte solution, improvements in high-temperature and high-voltage stabilities of the secondary battery by the fluorine-based polymer may be expected.

However, since the fluorine-based polymer has low surface energy, it is not only difficult to prepare the fluorine-based polymer as an injection-type electrolyte solution, but penetration of the fluorine-based polymer into an electrode is also not easy even if the fluorine-based polymer is injected, and thus, the fluorine-based polymer is disadvantageous in that it is difficult to achieve uniform stability because uniform distribution of the fluorine-based polymer on a surface of an electrode active material is difficult.

In order to overcome the disadvantage of the fluorine-based polymer, the present invention aims at providing a branched copolymer for a polymer electrolyte with improved solubility in the electrolyte solution by side-chain grafting a unit derived from an acrylate-based monomer or an acrylate-based polymer having high surface energy and solubility in the electrolyte solution to a main chain of the fluorine-based polymer. Also, the present invention aims at providing a composition for a polymer electrolyte with excellent electrode wetting by using the same.

That is, since the copolymer for a polymer electrolyte of the present invention has a smaller radius of gyration of a chain and more improved solubility in the electrolyte solution than a linear fluorine-based polymer having the same molecular weight, which contains the fluorine-based polymer as a main chain, due to a branched structure, a composition for an injection-type polymer electrolyte with low viscosity may be easily prepared by using the same. Furthermore, in a case in which the copolymer for a polymer electrolyte is used in the form of the composition for an injection-type polymer electrolyte, it may be applied and distributed in a uniform form on a surface of the electrode.

Thus, if the copolymer for a polymer electrolyte of the present invention is used, mechanical strength and lithium ion transfer capability are improved, and a gel polymer electrolyte capable of forming a stable solid electrolyte interface (SEI) on the surface of the electrode may be prepared. Furthermore, a lithium secondary battery having improved high-temperature stability and stability against external impact may be prepared by including the same.

Copolymer for Polymer Electrolyte

First, in the present invention, provided is a copolymer for a polymer electrolyte which includes (A) a fluorine-based polymer and (B) a unit derived from an acrylate-based monomer or an acrylate-based polymer, wherein the unit derived from the acrylate-based monomer or the acrylate-based polymer is grafted on the fluorine-based polymer.

(A) Fluorine-Based Polymer

The copolymer for a polymer electrolyte of the present invention may include a fluorine-based polymer structure represented by Formula 1 as a main chain.

[Formula 1]

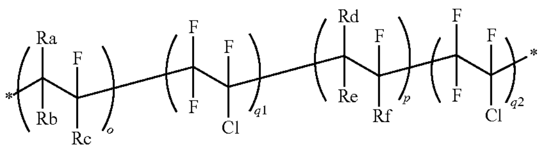

In Formula 1,

Ra to Rf are each independently hydrogen, a fluorine element, or an alkyl group having 1 to 10 carbon atoms, and o, p, q1, and q2 are the numbers of repeating units, wherein o is an integer of 0 to 400, p is an integer of 0 to 400, q1 is an integer of 1 to 300, and q2 is an integer of 0 to 300.

The fluorine-based polymer is a polymer in which a branched chain may form a grafting structure by atom transfer radical polymerization, wherein, as a representative example, the fluorine-based polymer may include a polychlorotrifluoroethylene (PCTFE) unit as an essential unit. Also, in addition to the polychlorotrifluoroethylene unit, the fluorine-based polymer may further include at least one unit selected from the group consisting of polyvinylidene fluoride (PVDF), polyvinyl fluoride (PVF), polytetrafluoroethylene (PTFE), polytrifluoroethylene (PTrFE), and poly-1,2-difluoroethylene.

Specifically, polychlorotrifluoroethylene (PCTFE), poly(vinylidene fluoride-co-chlorotrifluoroethylene, P(VDF-co-CTFE)), or poly(vinylidene fluoride-co-chlorotrifluoroethylene-co-trifluoroethylene), P(VDF-co-CTFE-co-TrFE)) may be used as the fluorine-based polymer.

That is, in the present invention, fluidity of the polymer chain may be improved by reducing crystallinity of the fluorine-based polymer by grafting a functional group cable of conducting lithium ions, such as an acrylate-based monomer, as a side chain onto the fluorine-based polymer through atomic transfer radical polymerization (ATRP). As a result, a copolymer for a polymer electrolyte with high solubility in the electrolyte solution may be prepared. Thus, if the copolymer for a polymer electrolyte with high solubility in the electrolyte solution is used, since a state, in which the copolymer is uniformly dissolved in the electrolyte, may be maintained while the copolymer does not cause an increase in resistance in the electrode, the copolymer for a polymer electrolyte may be uniformly distributed on the surface of the electrode. Thus, a gel polymer electrolyte, which may form a stable SEI and may simultaneously improve a radical-scavenging action by a fluorine (F) group and high-temperature stability of a positive electrode, may be prepared.

(B) Unit Derived from Acrylate-Based Monomer or Acrylate-Based Polymer

The copolymer for a polymer electrolyte of the present invention may include a unit derived from an acrylate-based monomer or an acrylate-based polymer as a unit grafted to the fluorine-based polymer as a main chain. Specifically, the acrylate-based monomer or the acrylate-based polymer may be bonded to the main chain in the form of a side chain or pendant group through a polymerization reaction.

The acrylate-based monomer may be exemplified by various types of methacrylate or acrylate compounds including a "—C(═O)O" structure in its structure.

Also, the acrylate-based polymer is not particularly limited as long as it is a copolymer which includes a repeating unit derived from the acrylate-based monomer in an amount of 10 wt % to 90 wt %, particularly 40 wt % to 80 wt %, and more particularly 45 wt % to 70 wt % based on a total weight of the acrylate-based polymer.

In this case, the expression "repeating unit" denotes a state in which the corresponding acrylate-based monomer undergoes a polymerization reaction to form a skeleton such as the main chain or side chain of the copolymer.

The unit derived from the acrylate-based monomer or the acrylate-based polymer is characterized in that it has high surface energy by including a "—COO" structure in its structure. Thus, if the unit derived from the acrylate-based monomer or the acrylate-based polymer is grafted on the linear fluorine-based polymer as the main chain, surface energy of the conventional linear fluorine-based polymer is improved, and thus, a copolymer for a polymer electrolyte with improved solubility in the electrolyte solution may be prepared. The solubility of the copolymer for a polymer electrolyte in the electrolyte solution may be appropriately controlled by controlling the structure of the grafted unit derived from the acrylate-based monomer or the acrylate-based polymer.

(C) Copolymer for Polymer Electrolyte

Specifically, the copolymer for a polymer electrolyte of the present invention may be represented by Formula 2 below.

[Formula 2]

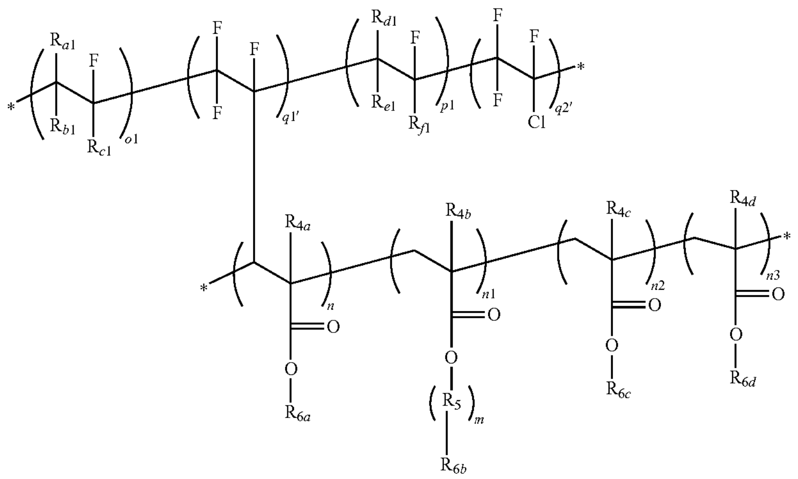

In Formula 2, $R_{a1}$ to $R_{f1}$ are each independently hydrogen, a fluorine element, or an alkyl group having 1 to 10 carbon atoms, $R_{4a}$ to $R_{4d}$ are each independently hydrogen or a substituted or unsubstituted alkyl group having 1 to 4 carbon atoms, $R_5$ is a substituted or unsubstituted alkylene group having 1 to 5 carbon atoms, $R_{6a}$ to $R_{6d}$ are each independently an alkyl group having 1 to 15 carbon atoms which is substituted or unsubstituted with at least one halogen element, an alkenyl group having 2 to 15 carbon atoms which is substituted or unsubstituted with at least one halogen element, a cyclic alkyl group having 3 to 10 carbon atoms, a heterocyclic group having 3 to 10 carbon atoms, a cyclic ether group having 3 to 10 carbon atoms, a heterocyclic ether group having 3 to 10 carbon atoms, $—(CH_2)_d—(CR_{18}R_{19})_e—OH$ ($R_{18}$ and $R_{19}$ are each independently hydrogen or an alkyl group having 1 to 5 carbon atoms, and d and e are each independently an integer of 0 to 10, but are not 0 at the same time), $—(R_7)_g—O—(R_8)_h—CH_3$ ($R_7$ and $R_8$ are each independently a substituted or unsubstituted alkylene group having 1 to 15 carbon atoms, and g and h each are an integer of 1 to 10), an aryl group having 6 to 12 carbon atoms, $—(CH_2)_f—CN$ (f is an integer of 0 to 10), $—(CH_2)_i—O—CH_2═CH_2$ (i is an integer of 0 to 10), $—(CH_2)_j—Si(R_{10})_k(OCH_2CH_3)_{3-k}$ ($R_{10}$ is hydrogen (H), j is an integer of 1 to 10, and k is an integer of 1 to 3), $—(CH_2)_w—NCO$ (w is an integer of 1 to 10), $—CH_2CH_2—N(CH_3)_2$, $—(CH_2)_x—A$ (A═—OC(═O)$(CH_2)_y$COOH (y is an integer of 1 to 10) or —C(═O)$(CH_2)_z$COOH (z is an integer of 1 to 10)),

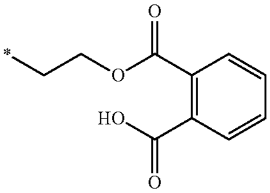

, or

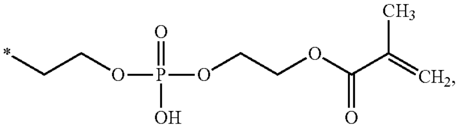

m is an integer of 0 to 10, and o1, p1, q1', q2', n, n1, n2, and n3 are the numbers of repeating units, wherein o1 is an integer of 0 to 400, p1 is an integer of 0 to 400, q1' is an integer of 1 to 300, q2' is an integer of 0 to 300, o1and q2' are not 0 at the same time, n is an integer of 1 to 2,000, n1 is an integer of 0 to 2,000, n2 is an integer of 0 to 2,000, and n3 is an integer of 0 to 2,000.

Specifically, in Formula 2, $R_{a1}$ to $R_{f1}$ are each independently hydrogen or a fluorine element, $R_{4a}$ to $R_{4d}$ are each independently hydrogen or a substituted or unsubstituted alkyl group having 1 to 3 carbon atoms, $R_5$ is a substituted or unsubstituted alkylene group having 1 to 3 carbon atoms, $R_{6a}$ to $R_{6d}$ are each independently an alkyl group having 1 to 10 carbon atoms which is substituted or unsubstituted with at least one halogen element, an alkenyl group having 2 to 12 carbon atoms which is substituted or unsubstituted with at least one halogen element, a cyclic alkyl group having 3 to 8 carbon atoms, a heterocyclic group having 3 to 8 carbon atoms, a cyclic ether group having 3 to 8 carbon atoms, a heterocyclic ether group having 3 to 8 carbon atoms, $—(CH_2)_d—(CR_{18}R_{19})_e—OH$ ($R_{18}$ and $R_{19}$ are each independently hydrogen or an alkyl group having 1 to 3 carbon atoms, and d and e are each independently an integer of 1 to 8), $—(R_7)_g—O—(R_8)_h—CH_3$ ($R_7$ and $R_8$ are each independently a substituted or unsubstituted alkylene group having 1 to 10 carbon atoms, and g and h each are an integer of 1 to 8), an aryl group having 6 to 10 carbon atoms, $—(CH_2)_f—CN$ (f is an integer of 1 to 8), $—(CH_2)_i—O—CH_2═CH_2$ (i is an integer of 1 to 9), $—(CH_2)_j—Si(R_{10})_k(OCH_2CH_3)_{3-k}$ ($R_{10}$ is H, j is an integer of 1 to 8, and k is an integer of 1 or 2), $—(CH_2)_w—NCO$ (w is an integer of 2 to 8), $—CH_2CH_2—N(CH_3)_2$, $—(CH_2)_x$-A (A═—OC(═O)$(CH_2)_y$COOH (y is an integer of 1 to 8) or —C(═O)$(CH_2)_z$COOH (z is an integer of 1 to 8)), m is an integer of 0 to 8, and o1, p1, q1', q2', n, n1, n2, and n3 are the numbers of repeating units, wherein o1 is an integer of 0 to 300, p1 is an integer of 0 to 300, q1' is an integer of 1 to 250, q2' is an integer of 0 to 250, o1 and q2' are not 0 at the same time, n is an integer of 1 to 1,300, n1 is an integer of 0 to 1,300, n2 is an integer of 0 to 1,300, and n3 may be an integer of 0 to 1,300.

More specifically, in Formula 2, $R_{6a}$ is a substituted or unsubstituted alkyl group having 2 to 10 carbon atoms or a substituted or unsubstituted alkenyl group having 2 to 12 carbon atoms, $R_{6b}$ is an alkyl group having 1 to 10 carbon atoms which is substituted or unsubstituted with at least one halogen element, an alkenyl group having 2 to 12 carbon atoms which is substituted or unsubstituted with at least one halogen element, a cyclic alkyl group having 3 to 8 carbon atoms, a heterocyclic group having 3 to 8 carbon atoms, a cyclic ether group having 3 to 8 carbon atoms, $—(CH_2)_d—(CR_{18}R_{19})_e—OH$ ($R_{18}$ and $R_{19}$ are each independently hydrogen or an alkyl group having 1 to 3 carbon atoms, and d and e are each independently an integer of 1 to 8), $—(R_7)_g—O—(R_8)_h—CH_3$ ($R_7$ and $R_8$ are each independently a substituted or unsubstituted alkylene group having 1 to 10 carbon atoms, and g and h each are an integer of 1 to 8), $—(CH_2)_i—O—CH_2═CH_2$ (i is an integer of 1 to 9), or $—(CH_2)_x$-A (A═—OC(═O)$(CH_2)_y$COOH (y is an integer of 1 to 8) or —C(═O)$(CH_2)_z$COOH (z is an integer of 1 to 8)), $R_{6c}$ is an alkyl group having 1 to 10 carbon atoms which is substituted or unsubstituted with at least one halogen element, an alkenyl group having 2 to 12 carbon atoms which is substituted or unsubstituted with at least one halogen element, a heterocyclic group having 3 to 8 carbon atoms, a cyclic ether group having 3 to 8 carbon atoms, a heterocyclic ether group having 3 to 8 carbon atoms, $—(CH_2)_d—(CR_{18}R_{19})_e—OH$ ($R_{18}$ and $R_{19}$ are each independently hydrogen or an alkyl group having 1 to 3 carbon atoms, and d and e are each independently an integer of 1 to 8), $—(CH_2)_f—CN$ (f is an integer of 1 to 8), $—(CH_2)_w—NCO$ (w is an integer of 2 to 8), $—CH_2CH_2—N(CH_3)_2$, or $—(CH_2)_x$-A (A═—OC(═O)$(CH_2)_y$COOH (y is an integer of 1 to 8) or —C(═O)$(CH_2)_z$COOH (z is an integer of 1 to 8)), and $R_{6d}$ may be a cyclic alkyl group having 3 to 8 carbon atoms, a heterocyclic group having 3 to 8 carbon atoms, a cyclic ether group having 3 to 8 carbon atoms, a heterocyclic ether group having 3 to 8 carbon atoms, $—(CH_2)_d—(CR_{18}R_{19})_e—OH$ ($R_{18}$ and $R_{19}$ are each independently hydrogen or an alkyl group having 1 to 3 carbon atoms, and d and e are each independently an integer of 1 to 8), an aryl group having 6 to 10 carbon atoms, $—(CH_2)_f—CN$ (f is an integer of 1 to 8), $—(CH_2)_i—O—CH_2═CH_2$ (i is an integer of 1 to 9), $—(CH_2)_w—NCO$ (w is an integer of 2 to 8), or $—CH_2CH_2—N(CH_3)_2$.

The copolymer for a polymer electrolyte of the present invention has a difference in properties depending on a main-chain structure containing a fluorine element and a structure and a ratio of the unit derived from the acrylate-based monomer or acrylate-based polymer which is grafted to the main chain.

For example, in Formula 2, in a case in which a cyclic alkyl group, a heterocyclic group, a cyclic ether group, or an aryl group is included as a terminal group of the unit derived from the acrylate-based monomer or the acrylate-based polymer which is grafted, the solubility of the copolymer in a solution of the composition for a polymer electrolyte may be controlled, and the wetting to the electrode may be further improved by controlling viscosity and surface energy of the composition for a polymer electrolyte.

Also, in Formula 2, in a case in which at least one curable functional group selected from a carboxyl group, a hydroxy group, a vinyl group, an alkoxysilyl group, a phosphate group, a succinate group, a phthalate group, and an isocyanate group is included as the terminal group of the unit derived from the acrylate-based monomer or the acrylate-based polymer which is grafted, high-temperature safety may be further improved by forming a more uniform SEI on the surface of the electrode.

In the copolymer for a polymer electrolyte represented by Formula 2, units having the same or different structure as the units derived from the acrylate-based monomer or the acrylate-based polymer, which respectively constitute the repeating unit n, repeating unit n1, repeating n2, and repeating unit n3, may be further substituted and boned to the terminal groups of the units derived from the acrylate-based monomer or the acrylate-based polymer, that is, $R_{6a}$ to $R_{6d}$.

The copolymer for a polymer electrolyte of the present invention as described above may include at least one selected from the group consisting of:

polychlorotrifluoroethylene-g-poly(butyl acrylate) (PCTFE-g-P(BA)) represented by the following Formula 3a;

[Formula 3a]

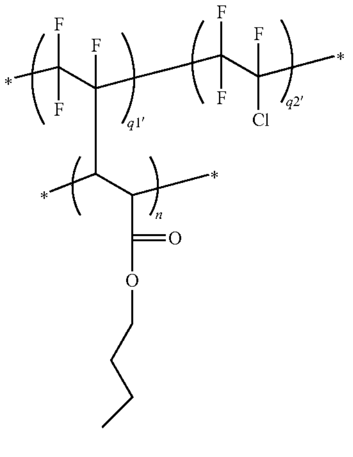

(In Formula 3a,
q1', q2', and n are the numbers of repeating units,
wherein q1' is an integer of 1 to 300,
q2' is an integer of 0 to 300, and
n is an integer of 1 to 2,000.)

polychlorotrifluoroethylene-g-poly (pentenyl acrylate) (PCTFE-g-P(PA));

polychlorotrifluoroethylene-g-poly(butyl acrylate-r-hydroxybutyl acrylate-r-acryloyloxyethyl isocyanate) (PCTFE-g-P(BA-r-HBA-r-AOI));

polychlorotrifluoroethylene-g-poly (butyl acrylate-r-ethoxyethyl acrylate-r-hydroxybutyl acrylate-r-acryloyloxyethyl isocyanate) (PCTFE-g-P(BA-r-EEA-r-HBA-r-AOI);

poly chlorotrifluoroethylene-g-poly (butyl acrylate-r-tetrahydrofurfuryl acrylate) (PCTFE-g-P(BA-THFA));

poly chlorotrifluoroethylene-g-poly (butyl acrylate-r-tetrahydrofurfuryl acrylate-r-trifluoroethyl acrylate) (PCTFE-g-P(BA-r-THFA-r-TFEA));

polychlorotrifluoroethylene-g-poly(butyl acrylate-r-tetrahydrofurfuryl acrylate-r-perfluorooctyl acrylate) (PCTFE-g-P(BA-r-THFA-r-PFOA);

polyvinylidene fluoride-g-poly(butyl acrylate) (PVDF-g-P(BA)) represented by the following Formula 3b;

[Formula 3b]

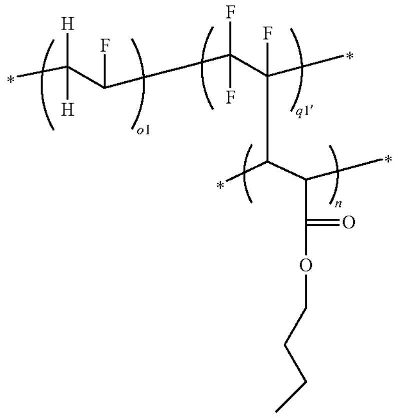

(In Formula 3b,
o1, q1', and n are the numbers of repeating units,
wherein o1 is an integer of 1 to 400,
q1' is an integer of 1 to 300, and
n is an integer of 1 to 2,000.)

polyvinylidene fluoride-co-(polychlorotrifluoroethylene-g-poly(butyl acrylate))-co-polytrifluoroethylene (PVDF-co-(PCTFE-gP(BA))-co-PTrFE) represented by the following Formula 3c;

[Formula 3c]

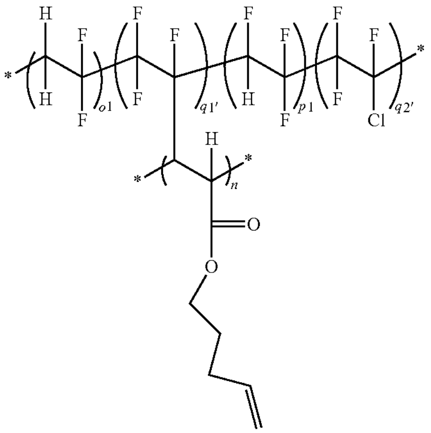

(In Formula 3c,
O1, q1', p1, q2', and n are the numbers of repeating units,
wherein o1 is an integer of 1 to 400,
p1 is an integer of 1 to 400,
q1' is an integer of 1 to 300,
q2' is an integer of 1 to 300, and
n is an integer of 1 to 2,000.)

polyvinylidene fluoride-co-polychlorotrifluoroethylene-g-poly(butyl acrylate) (PVDF-co-(PCTFE-g-P(BA)); and polychlorotrifluoroethylene-g-poly(butyl acrylate-r-hydroxybutylacrylate) (PCTFE-g-P(BA-r-HBA)).

In Formula 2, a weight ratio of the repeating unit q1':the repeating unit o1:the repeating unit p1:the repeating unit q2' may be in a range of 1:0:0.01:0.01 to 1:100:100:300, particularly 1:0:0.1:0.1 to 1:50:50:10, and more particularly 1:0:0.1:0.1 to 1:10:10:1.

In this case, when the weight ratio of each of the repeating unit o1 and the repeating unit p1 to the repeating unit q1' is greater than 100, or the weight of the repeating unit q2' to the repeating unit q1' is greater than 300, since an effect of reducing the crystallinity of the fluorine-based polymer electrolyte is insignificant, the fluidity of the polymer chain is reduced, and thus, solubility in the electrolyte may be reduced. Also, if the weight ratio of each of the repeating unit p1 and the repeating unit q2' to the repeating unit q1' is less than 0.01, since a radical-scavenging effect by the fluorine group is insignificant, high-temperature, high-voltage stability of the battery may be reduced.

Furthermore, in Formula 2, a weight ratio of the repeating unit n:the repeating unit n1:the repeating n2:the repeating unit n3 may be in a range of 1:0:0:0 to 1:10:10:10.

In a case in which the repeating units satisfy the above range, since the wetting to the electrode may be further improved by controlling the viscosity and surface energy of the copolymer with respect to the electrolyte solution, high capacity and high energy density of the secondary battery may be secured.

Also, in the copolymer for a polymer electrolyte represented by Formula 2 of the present invention, a moiety ($-C(=O)-O-R_5$) contained in the unit derived from the acrylate-based monomer or the acrylate-based polymer may be included in an amount of 1 wt % to 90 wt %, for example, 10 wt % to 60 wt % based on a total weight of the copolymer for a polymer electrolyte represented by Formula 1.

If the amount of the moiety is less than 1 wt %, since electrode wetting is not sufficient due to low surface energy of the copolymer for a polymer electrolyte, penetration of the electrolyte solution into the electrode is not easy. Thus, it is difficult to form a stable SEI on the surface of the electrode active material. In contrast, if the amount of the moiety is greater than 90 wt %, since the radical-scavenging effect by the fluorine-based polymer is insignificant, desired purpose of improving high-temperature stability of the battery may not be achieved.

Also, in the copolymer for a polymer electrolyte represented by Formula 2 of the present invention, a weight ratio of the fluorine-based polymer to the unit derived from the acrylate-based monomer or the acrylate-based polymer may be in a range of 1:99 to 40:60, preferably 2:98 to 30:70, and more particularly 5:95 to 25:75.

In a case in which the weight ratio of the unit derived from the acrylate-based monomer or the acrylate-based polymer to the fluorine-based polymer is greater than 99, since the radical-scavenging effect by the fluorine-based polymer is insignificant, the desired purpose of improving the high-temperature stability of the battery may not be achieved. Furthermore, in a case in which the weight ratio of the unit derived from the acrylate-based monomer or the acrylate-based polymer to the fluorine-based polymer is less than 60, the solubility of the copolymer for a polymer electrolyte in the solution of the composition for a polymer electrolyte is reduced while the surface energy of the copolymer for a polymer electrolyte is reduced. That is, since affinity between the electrolyte solution and the copolymer is low at room temperature due to a difference in polarity, an effect of improving miscibility between the electrolyte solution and the copolymer is insignificant. Thus, it is difficult to prepare an injection-type electrolyte solution during the preparation of the lithium secondary battery, and, as a result, since the penetration of the copolymer for a polymer electrolyte into the electrode is not easy, the electrode wetting is reduced. Therefore, since the copolymer for a polymer electrolyte is difficult to be uniformly distributed on the surface of the electrode, there is a disadvantage in that it is difficult to form a stable SEI on the surface of the electrode.

Also, a weight-average molecular weight of the copolymer for a polymer electrolyte of the present invention may be adjusted according to the main-chain structure of the fluorine polymer and the structure and ratio of the unit derived from the acrylate-based monomer or the acrylate-based polymer, as the pendant group, and may specifically be in a range of 1,000 g/mol to 200,000 g/mol.

In a case in which the weight-average molecular weight of the copolymer for a polymer electrolyte is within the above range, ion transfer capability of the polymer electrolyte is improved, and electrochemical stability may be secured.

For example, if the weight-average molecular weight of the copolymer for a polymer electrolyte is greater than 200,000 g/mol, since the solubility in the composition for a polymer electrolyte is reduced to increase the viscosity of the composition for a polymer electrolyte even if a small amount of the copolymer for a polymer electrolyte is added, the viscosity exceeds a predetermined level to reduce wetting and impregnability in the battery, and thus, the electrochemical stability of the secondary battery may be reduced.

The weight-average molecular weight (Mw) of the copolymer for a polymer electrolyte may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, column: Ultrahydrogel linearX2, eluent: 0.1M $NaNO_3$ (pH 7.0 phosphate buffer, flow rate: 0.1 mL/min, temp: 40° C., injection: 100 μL)).

With respect to the copolymer for a polymer electrolyte of the present invention as described above, the surface energy may be improved and the solubility in the electrolyte solution may be improved by the acrylate-based functional group grafted to the side chain of the fluorine-based polymer. Thus, the copolymer for a polymer electrolyte does not cause an increase in internal resistance of the electrode even if the copolymer for a polymer electrolyte containing the fluorine-based element is introduced into the electrolyte, and may not only maintain a state in which it is uniformly distributed in the electrolyte, but may also exhibit the radical-scavenging action by the fluorine element and an improvement in the high-temperature stability of the positive electrode.

Method of Preparing Polymer for Electrolyte

Hereinafter, a method for preparing the copolymer for a polymer electrolyte of the present invention will be described.

The copolymer for a polymer electrolyte of the present invention may be prepared by using a graft-from atomic transfer radical polymerization (hereinafter, referred to as "ATRP") method. In this case, purity of the polymer may be improved by adjusting a molecular weight distribution.

The graft-from ATRP method may include the steps of:

(a) mixing an acrylate-based monomer or an acrylate-based polymer with a fluorine-based polymer, as a polymerizable monomer, in a reaction solvent;

(b) adding an ATRP catalyst into the reaction solvent and performing an ATRP reaction to prepare a copolymer for a polymer electrolyte; and (c) adding an appropriate non-solvent to remove the catalyst and the unreacted monomers.

Various solvents known in the art may be used as the reaction solvent, and, for example, N-methyl-2-pyrrolidone (NMP), gamma-butyrolactone (GBL), dimethylformamide (DMF), dimethyl sulfoxide (DMSO), dimethylacetamide (DMAc), acetonitrile (AcCN), ethyl acetate (EA), methyl ethyl ketone (MEK), or tetrahydrofuran (THF) may be used, but the reaction solvent is not limited thereto.

Also, the fluorine-based polymer and the acrylate-based monomer or the acrylate-based polymer may be mixed in a weight ratio of 1:0.1 to 1:99.

If the acrylate-based monomer or acrylate-based polymer is mixed in a weight ratio of less than 0.1, since solubility of the polymer in the solvent is reduced during the preparation of the composition for a polymer electrolyte of the present invention to be described later and ionic conductivity is excessively reduced, there is a risk that internal resistance of the battery is increased. In contrast, if the acrylate-based monomer is mixed in a weight ratio of greater than 99, since the radical-scavenging effect by the fluorine element is insignificant, the desired purpose of improving the high-temperature stability of the battery may not be achieved.

Furthermore, the catalyst is a catalyst usable for the ATRP reaction, wherein typical examples thereof may be Cu(I)Cl, Cu(II)$Cl_2$, Cu(I)Br, Cu(II)$Br_2$, Fe(II)$Cl_2$, Fe(III)$Cl_3$, or a mixture thereof, but the catalyst may preferably include Cu(I)Cl, Cu(II)$Cl_2$, Cu(I)Br, Cu(II)$Br_2$, or a mixture thereof.

The catalyst may be included in an amount of 0.0001 part by weight to 1 part by weight, 0.0005 part by weight to 0.5 part by weight, or 0.001 part by weight to 0.1 part by weight based on 100 parts by weight of the total monomer mixture. In a case in which the amount of the catalyst is less than 0.0001 part by weight, a reaction rate is very slow, and, in a case in which the amount of the catalyst is greater than 1 part by weight, since gelation may occur before the formation of the polymer or the removal of the catalyst may be very difficult, the amount of the catalyst is appropriately selected within the above range.

A ligand or a reducing agent may be further mixed with the catalyst during the ATRP reaction, if necessary.

The ligand is not particularly limited as long as it is bonded to the catalyst to be able to be used in the polymerization reaction, wherein the ligand may be exemplified by, for example, a ligand having at least one nitrogen, oxygen, phosphorus, and sulfur atom capable of coordinating with the catalyst through a σ-bond or a ligand containing two or more carbon atoms capable of coordinating with the catalyst through a π-bond, but the ligand is not limited thereto. Specifically, the ligand may include at least one selected from the group consisting of PMDETA (N,N,N',N",N'"-pentamethyldiethylenetriamine), bpy (2,2'-bipyridine), dNbpy (4,4'-di-5-nonyl-2,2'-bipyridine), TPMA (tris (2-pyridylmethyl)amine), and Me6TREN (tris(2-dimethylaminoethyl)amine).

The ligand may be included in an amount of 50 parts by weight to 2,000 parts by weight, 100 parts by weight to 1,000 parts by weight, or 200 parts by weight to 500 parts by weight based on 100 parts by weight of the catalyst. In a case in which the amount of the ligand is less than 50 parts by weight, since the formation of a metal composite by bonding with the catalyst is excessively small, the reaction is very slow or does not proceed, and, in a case in which the amount of the ligand is greater than 2,000 parts by weight, manufacturing cost is increased and there is a concern that a side reaction due to the use of the excessive amount of the ligand may occur.

An example of the reducing agent may be a radical generator, such as azobisisobutyronitrile (AIBN), an organic reducing agent, or an inorganic reducing agent, which is commonly used in the ATRP reaction, but the reducing agent is not limited thereto.

The ATRP method of the present invention is performed under a temperature condition of 30° C. to 100° C., for example, 60° C., and may obtain a copolymer for a polymer electrolyte having a controlled structure or molecular weight.

Since electrons are balanced and decomposed between activated carbon and the halogen element (Cl) of the fluorine-based polymer, such as polychlorotrifluoroethylene (PCTFE), by the metal catalyst, such as Cu(II)$Cl_2$, during the ATRP reaction, a radical with properties that do not lose polymerization activity (e.g., living properties) is formed at an end of the fluorine-based polymer. Since the polymerization reaction is initiated by the radical, the unit derived from the acrylate-based monomer or the acrylate-based polymer may be grafted to the main chain of the fluorine-based polymer as a pendant group.

In addition to the graft-from ATRP method, the copolymer for a polymer electrolyte of the present invention may also be synthesized by a living polymerization method such as an ATRP polymerization method using an initiator containing a nucleophilic functional group or a Reversible Addition-Fragmentation Chain Transfer (RAFT) polymerization method.

The ATRP polymerization method using the initiator containing the nucleophilic functional group is a method in which, after a polymer for a side chain containing a hydroxy group at its end is synthesized by using an ATRP initiator containing a hydroxy group, the polymer for a side chain is reacted with a fluorine-based polymer to be introduced as a pendant group. In this case, the nucleophilic functional group may be substituted into a position of chlorine (Cl) element contained in the fluorine-based polymer in the presence of a reducing agent, such as LiH, NaH, and $LiBH_4$, to form a branched polymer.

Also, the RAFT method is a method in which, after a terminal RAFT functional group is reduced to synthesize a polymer for a side chain containing a thiol group, the polymer for a side chain is reacted with a fluorine-based polymer to be introduced as a pendant group.

Composition for Polymer Electrolyte

Also, in the present invention, provided is a composition for a polymer electrolyte which includes (1) a non-aqueous electrolyte solution and (2) the copolymer for a polymer electrolyte of the present invention.

In this case, since a description of (2) the copolymer for a polymer electrolyte, which is included in the composition for a polymer electrolyte of the present invention, overlaps with those described above, the description thereof will be omitted.

However, the amount of the copolymer for a polymer electrolyte may be appropriately selected in consideration of the weight-average molecular weight of the copolymer for a polymer electrolyte, and the copolymer for a polymer electrolyte may specifically be included in an amount of 0.01 wt % to 30 wt % based on a total weight of the composition for a polymer electrolyte.

Specifically, in a case in which the weight-average molecular weight of the copolymer for a polymer electrolyte of the present invention is less than 15,000 g/mol, the copolymer for a polymer electrolyte may be included in an amount of 0.01 wt % to 25 wt %, particularly 0.1 wt % to 22 wt %, and more particularly 0.1 wt % to 20 wt % based on the total weight of the composition for a polymer electrolyte, and, in a case in which the weight-average molecular weight of the copolymer for a polymer electrolyte is 15,000 g/mol or more to 100,000 g/mol or less, the copolymer for a polymer electrolyte may be included in an amount of 0.01 wt % to 15 wt %, for example, 0.01 wt % to 10 wt % based on the total weight of the composition for a polymer electrolyte.

Also, in a case in which the weight-average molecular weight of the copolymer for a polymer electrolyte is greater than 100,000 g/mol and equal to or less than 200,000 g/mol, the copolymer for a polymer electrolyte may be included in an amount of 0.01 wt % to 10 wt %, for example, 0.01 wt % to 8 wt % based on the total weight of the composition for a polymer electrolyte.

That is, when the weight-average molecular weight of the copolymer for a polymer electrolyte is about 12,000 g/mol, if the copolymer for a polymer electrolyte is included in an amount of 25 wt % or more based on the total weight of the composition for a polymer electrolyte, an effect of reducing surface tension due to structural characteristics of the polymer may occur, but safety of the battery may be reduced as ionic conductivity is reduced due to an increase in viscosity of the composition for a polymer electrolyte.

In a case in which the copolymer for a polymer electrolyte is included within the above range, impregnability, SEI-forming effect, and physical properties, such as viscosity and ionic conductivity, of the composition for a polymer electrolyte may be secured. If the copolymer for a polymer electrolyte is included in an amount of less than 0.01 wt %, since a network reaction between polymers for forming a gel polymer electrolyte is difficult to be formed, a stability improvement effect due to the introduction of the gel polymer electrolyte of the present invention may be insignificant. Also, in a case in which the copolymer for a polymer electrolyte is included in an amount of greater than 30 wt %, the safety of the battery may be reduced as the ionic conductivity is reduced due to the increase in the viscosity of the composition for a polymer electrolyte.

(1) Non-Aqueous Electrolyte Solution

The non-aqueous electrolyte solution is an electrolyte solution used in a conventional lithium secondary battery, wherein the non-aqueous electrolyte solution is not particularly limited as long as it includes a lithium salt and an organic solvent.

(1-1) Lithium Salt

The lithium salt is used as an electrolyte salt in the lithium secondary battery, wherein it is used as a medium for transferring ions. Typically, the lithium salt may include at least one compound selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, LiTFSI, LiFSI, and $LiClO_4$, and may preferably include $LiPF_6$, but the lithium salt is not limited thereto.

One or a mixture of two or more thereof, if necessary, may be used as the lithium salt. The lithium salt may be included in an amount of 0.5 M to 5 M, for example, 0.5 M to 4 M. In a case in which the amount of the lithium salt is less than the above range, since a concentration of lithium ions in the electrolyte is low, charge and discharge of the battery may not be performed properly, and, in a case in which the amount of the lithium salt is greater than the above range, since viscosity of the gel polymer electrolyte may be increased to reduce wetting in the battery, performance of the battery may be degraded.

(1-2) Organic Solvent

The organic solvent is an electrolyte solution solvent typically used in a lithium secondary battery, wherein a solvent, which may minimize decomposition due to an oxidation reaction during charge and discharge of the secondary battery and may exhibit desired characteristics with an additive, may be used as the organic solvent.

A cyclic carbonate organic solvent, a linear carbonate organic solvent, and a mixed organic solvent thereof may be used as the organic solvent, and, specifically, in order to improve charge and discharge performance of the battery, high ionic conductivity and high permittivity may be achieved by mixing the cyclic carbonate-based organic solvent and the linear carbonate-based organic solvent.

The cyclic carbonate organic solvent is a solvent which well dissociates the lithium salt in the electrolyte due to high permittivity as a highly viscous organic solvent, wherein the cyclic carbonate organic solvent may specifically include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), and, among them, the cyclic carbonate organic solvent may include ethylene carbonate or propylene carbonate which may stably maintain passivation ability of the SEI.

The linear carbonate organic solvent is an organic solvent having low viscosity and low permittivity, wherein the linear carbonate organic solvent may include at least one organic solvent selected from the group consisting of dimethyl carbonate (DMC), diethyl carbonate (DEC), dipropyl carbonate, ethylmethyl carbonate (EMC), methylpropyl carbonate, and ethylpropyl carbonate, and, among them, the linear carbonate organic solvent may include dimethyl carbonate (DMC) having low viscosity characteristics while having a small molecular size.

In addition, at least one selected from a cyclic ester organic solvent, a linear ester organic solvent, an ether organic solvent, a glyme organic solvent, and a nitrile organic solvent may be further used as the organic solvent, if necessary.

Specific examples of the cyclic ester organic solvent may be at least one organic solvent selected from the group consisting of γ-butyrolactone, γ-valerolactone, γ-caprolactone, σ-valerolactone, and ε-caprolactone.

The linear ester-based organic solvent may include at least one organic solvent selected from the group consisting of methyl acetate, ethyl acetate, propyl acetate, methyl propionate, ethyl propionate, propyl propionate, and butyl propionate.

As the ether organic solvent, any one selected from the group consisting of dimethyl ether, diethyl ether, dipropyl ether, methylethyl ether, methylpropyl ether, and ethylpropyl ether or a mixture of two or more thereof may be used.

The glyme organic solvent is a solvent having higher dielectric constant and lower surface tension than the linear carbonate-based organic solvent and having lower reactivity with metal, wherein the glyme organic solvent may include at least one selected from the group consisting of dimethoxyethane (glyme, DME), diglyme, triglyme, and tetraglyme (TEGDME), but the glyme organic solvent is not limited thereto.

The nitrile organic solvent may include at least one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, but the nitrile organic solvent is not limited thereto.

(1-3) Polymerization Initiator

The electrolyte composition of the present invention may further include a polymerization initiator.

The polymerization initiator is to form a polymer network bonded in a three-dimensional structure by polymerizing the polymer of the present invention, wherein a conventional polymerization initiator known in the art may be used without limitation. The polymerization initiator may include a photopolymerization initiator or a thermal polymerization initiator according to a polymerization method.

Specifically, as a representative example, the photopolymerization initiator may include at least one selected from the group consisting of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxy-ethoxy]-ethyl ester, oxy-phenyl-acetic 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl)-phenylphosphine oxide, bis(eta 5-2,4-cyclopentadiene-1-yl), bis[2,6-difluoro-3-(1H-pyrrol-1-yl)phenyl]titanium, 4-isobutylphenyl-4'-methylphenyl iodonium, hexafluorophosphate, and methyl benzoylformate.

Also, as a representative example, the thermal polymerization initiator may include at least one selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis(methylbutyronitrile), 2,2'-azobis(iso-butyronitrile) (AIBN), and 2,2'-azobisdimethyl-valeronitrile (AMVN).

The polymerization initiator forms a radical by being dissociated by heat at 30° C. to 100° C. in the battery or by being dissociated by light, such as ultraviolet (UV), at room temperature (5° C. to 30° C.), and forms cross-linking by free radical polymerization so that a polymer may be polymerized.

The polymerization initiator may be used in an amount of 0.01 part by weight to 5 parts by weight, preferably 0.05 part by weight to 5 parts by weight, and more preferably 0.1 part by weight to 5 parts by weight based on 100 parts by weight of the copolymer for a polymer electrolyte. If the polymerization initiator is used within the above range, an amount of the unreacted polymerization initiator, which may adversely affect the battery performance, may be minimized. Also, in a case in which the polymerization initiator is included within the above range, gelation may be performed properly.

The electrolyte composition of the present invention may not include a polymerization initiator in order to provide a non-crosslinked dispersion-type gel polymer electrolyte in which cross-linking between the polymers for an electrolyte of the present invention is not formed.

(1-4) Multifunctional Crosslinking Agent

Also, the electrolyte composition of the present invention may further include a multifunctional crosslinking agent in order to induce a crosslinking reaction between the monomers and simultaneously further improve the high-temperature stability of the positive electrode.

The multifunctional crosslinking agent may react with a curing functional group included in the fluorine-based linear copolymer to form a crosslinked structure between polymers. Since an electrode protective layer formed in the crosslinked structure exhibits high chemical and electrochemical stability and protects the surface of the electrode active material from a side reaction with the electrolyte, problems, such as a decrease in Coulombic efficiency and degradation of cycle characteristics of the secondary battery, may be overcome.

A type of the multifunctional crosslinking agent is not particularly limited, and any one selected from the group consisting of an isocyanate crosslinking agent, an epoxy crosslinking agent, an aziridine crosslinking agent, an alcohol crosslinking agent, an amine-based crosslinking agent, and a vinyl-based crosslinking agent may be used.

As specific examples of the isocyanate crosslinking agent, a diisocyanate compound, such as toluene diisocyanate, xylene diisocyanate, diphenylmethane diisocyanate, hexamethylene diisocyanate, isoborone diisocyanate, tetramethylxylene diisocyanate, or naphthalene diisocyanate, or a compound obtained by reacting the diisocyanate compound with a polyol may be used, and, as the polyol, for example, trimethylol propane may be used.

Specific examples of the epoxy crosslinking agent may be at least one selected from the group consisting of ethylene glycol diglycidyl ether, triglycidyl ether, trimethylolpropane triglycidyl ether, N,N,N',N'-tetraglycidyl ethylenediamine, and glycerin diglycidyl ether.

Specific examples of the aziridine crosslinking agent may be at least one selected from the group consisting of N,N'-toluene-2,4-bis(1-aziridinecarboxamide), N,N'-diphenylmethane-4,4'-bis(1-aziridinecarboxamide), triethylene melamine, bisisoprotaloyl-1-(2-methylaziridine), and tri-1-aziridinylphosphine oxide, but the aziridine crosslinking agent is not limited thereto.

Specific examples of the alcohol crosslinking agent may be at least one selected from the group consisting of poly(alkylene glycol), glycerol, trismethylol propane, pentaerythritol, and dipentaerythritol, but the alcohol crosslinking agent is not limited thereto.

Also, specific examples of the amine-based crosslinking agent may be at least one selected from the group consisting of ethylenediamine, diethylenetriamine, triethylenetetramine, or modified amines thereof, and metaphenylenediamine, diaminodiphenylmethane, diaminodiphenyl sulfone, or modified amines thereof, but the amine-based crosslinking agent is not limited thereto.

The vinyl-based crosslinking agent is an organic compound having two or more vinyl groups in one molecule, wherein the vinyl-based crosslinking agent may include at least one selected from ethylene glycol di(meth)acrylate, 1,6-hexanediol di(meth)acrylate, tri(propylene glycol) di(meth)acrylate, tris(2-(meth)acryloethyl) isocyanate, trimethylolpropane tri(meth)acrylate, trimethylolpropane ethoxylate tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, and dipentaerythritol hexa(meth)acrylate, but the vinyl-based crosslinking agent is not limited thereto.

The multifunctional crosslinking agent may be included in an amount of 1 part by weight to 1,000 parts by weight, for example, 5 parts by weight to 500 parts by weight based on 100 parts by weight of the fluorine-based graft polymer. Physical properties of the electrolyte may be appropriately expressed at a desired level by controlling the amount of the crosslinking agent within the above-described range.

If, in a case in which the amount of the multifunctional crosslinking agent is less than 1 part by weight, since the amount is not sufficient to react the polymer, the polymer polymerization reaction may not be caused. In contrast, in a case in which the amount of the multifunctional crosslinking agent is greater than 1,000 parts by weight, since reactivity of the crosslinking agent is excessive, it is not easy to control the weight-average molecular weight of the polymer for a gel polymer electrolyte.

(1-5) Other Additives

Also, in order to further achieve effects of improving high-temperature storage characteristics, cycle life characteristics, low-temperature high rate discharge characteristics, overcharge prevention, and high-temperature swelling, the electrolyte composition of the present invention may further include other additives, if necessary.

These other additives are not particularly limited as long as these are additives capable of forming a stable film on surfaces of positive electrode and negative electrode while not significantly increasing initial resistance.

These other additives may include a commonly known electrolyte solution additive, specifically, at least one selected from the group consisting of vinylene carbonate (VC), $LiBF_4$, vinylethylene carbonate (VEC), 1,3-propane sultone (PS), 1,3-propene sultone (PRS), succinonitrile (SN), adiponitrile (Adn), fluoroethylene carbonate (FEC), ethylene sulfate (Esa), $LiPO_2F_2$, methyl trimethylene sulfate (MTMS), LiODFB (lithium difluorooxalatoborate), LiBOB (lithium bis-(oxalato)borate), tetraphenylborate (TPB), TMSPa (3-trimethoxysilanyl-propyl-N-aniline), TMSPi (tris(trimethylsilyl)phosphite), tris(2,2,2-trifluoroethyl)phosphate (TFEPa), and tris(trifluoroethyl)phosphite (TFEPi).

It is known that, particularly, vinylene carbonate, $LiBF_4$, 1,3-propane sultone (PS), and ethylene sulfate (Esa), among these other additives, may form a stable SEI on the surface of the negative electrode during an initial activation process of the secondary battery.

The other additives may be included in an amount of 10 wt % or less, for example, 0.5 wt % to 7 wt % based on the total weight of the electrolyte composition. If the amount of the other additives is greater than 10 wt %, not only there is a possibility that a side reaction in the electrolyte solution occurs excessively during charge and discharge due to the excessive amount of the additive used, but the additives may also be present in the form of an unreacted material or precipitates in the electrolyte solution at room temperature because the additives may not be sufficiently decomposed at high temperatures, and, accordingly, life or resistance characteristics of the secondary battery may be degraded.

Furthermore, the electrolyte composition of the present invention may include inorganic particles as other additives. Also, as the inorganic particles, a single compound selected from the group consisting of $BaTiO_3$, $Pb(Zr,Ti)O_3$ (PZT), $Pb_{1-a}La_aZr_{1-b}Ti_bO_3$ (PLZT, where $0<a<1$, $0<b<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $Al(OH)_3$, $TiO_2$, $SiO_2$, SiC, and a mixture thereof, or a mixture of at least two thereof may be used. In addition, inorganic particles having lithium ion transfer capability, that is, lithium phosphate ($Li_3PO_4$), lithium titanium phosphate ($Li_cTi_d(PO_4)_3$, $0<c<2$, $0<d<3$), lithium aluminum titanium phosphate ($Li_{a1}Al_{b1}Ti_{c1}(PO_4)_3$, $0<a1<2$, $0<b1<1$, $0<c1<3$), $(LiAlTiP)_{a2}O_{b2}$-based glass ($0<a2<4$, $0<b2<13$) such as $14Li_2O$-$9Al_2O_3$-$38TiO_2$-$39P_2O_5$, lithium lanthanum titanate ($Li_{a3}La_{b3}TiO_3$, $0<a3<2$, $0<b3<3$), lithium germanium thiophosphate ($Li_{a4}Ge_{b4}P_{c2}S_d$, $0<a4<4$, $0<b4<1$, $0<c2<1$, $0<d<5$) such as $Li_{3.25}Ge_{0.25}P_{0.75}S_4$, lithium nitride ($Li_{a5}N_{b5}$, $0<a5<4$, $0<b5<2$) such as $Li_3N$, $SiS_2$-based glass ($Li_{a6}Si_{b6}S_{c3}$, $0<a6<3$, $0<b6<2$, $0<c3<4$) such as $Li_3PO_4$—$Li_2S$-$Sis_2$, $P_2S_5$-based glass ($Li_{a7}P_{b7}S_{c5}$, $0<a7<3$, $0<b7<3$, $0<c5<7$), such as LiI—$Li_2S$—$P_2S_5$, or a mixture thereof may be used.

The inorganic particles may be included in an amount of 10 wt % or less, for example, 0.5 wt % to 7 wt % based on the total weight of the electrolyte composition. If the amount of the other additives is greater than 10 wt %, capacity characteristics and life characteristics of the secondary battery may be degraded due to an increase in resistance caused by the excessive amount of the additive used.

The composition for a polymer electrolyte of the present invention, which is prepared according to an embodiment of the present invention, may have a viscosity of 3 cp to 20 cp or less at room temperature (25° C.). If the viscosity is greater than the above range, bubbles may be generated when the electrolyte is injected or the wetting to the electrode may be reduced.

Gel Polymer Electrolyte

Also, in the present invention, provided is a gel polymer electrolyte which is formed by thermal polymerization of the composition for a polymer electrolyte of the present invention.

The gel polymer electrolyte according to the present invention may be formed by polymerization of the composition for a polymer electrolyte according to a method by typical in-situ polymerization or coating polymerization known in the art, and may be formed by using and dispersing a polymer in the electrolyte.

Specifically, the in-situ polymerization is a method of preparing a gel polymer electrolyte through steps of (a) inserting an electrode assembly composed of a positive electrode, a negative electrode, and a separator disposed between the positive electrode and the negative electrode into a battery case, and (b) injecting the composition for a polymer electrolyte according to the present invention into the battery case and performing polymerization.

An in-situ polymerization reaction in the lithium secondary battery may be performed by using E-beam, γ-ray, and room temperature/high temperature aging processes, and may be performed by thermal polymerization or photopolymerization. In this case, polymerization time required may be in a range of about 2 minutes to about 24 hours, thermal polymerization temperature may be in a range of 30° C. to 100° C., and photopolymerization temperature may be room temperature (5° C. to 30° C.).

More specifically, the in-situ polymerization reaction in the lithium secondary battery forms a gel polymer electrolyte in the form in which the gel polymer electrolyte composition is injected into a battery cell and then subjected to gelation through the polymerization reaction, and forms a gel polymer electrolyte in the form of being dispersed without the gelation through the polymerization reaction.

As another method, after the gel polymer electrolyte composition is coated on one surface of an electrode and a separator and is cured (gelated) by using heat or light such as UV, an electrode assembly is prepared by winding or laminating the electrode and/or separator having a gel polymer electrolyte formed thereon, and a lithium secondary battery may be prepared by inserting the electrode assembly into a battery case and re-injecting a conventional liquid electrolyte thereinto.

A conventional gel polymer electrolyte is disadvantageous in that its ionic conductivity is lower than that of a liquid electrolyte and wetting to the electrode is low. Also, stability and mechanical properties may be relatively poor in comparison to those of a solid polymer electrolyte.

However, since the gel polymer electrolyte of the present invention is prepared by using the composition for a polymer electrolyte containing the copolymer for a polymer electrolyte in which the solubility in the electrolyte solution is improved by grafting the unit derived from the acrylate-based monomer or the acrylate-based polymer on the fluorine-based polymer, the lithium ion transfer capability, the wetting to the electrode, and the mechanical properties may be secured and a stable SEI may be formed on the surface of the electrode without causing the internal resistance of the electrode. Thus, a lithium secondary battery having improved high-temperature stability may be prepared when the gel polymer electrolyte of the present invention is included.

Lithium Secondary Battery

Furthermore, in the present invention, a lithium secondary battery including the gel polymer electrolyte may be provided.

Specifically, the lithium secondary battery includes a positive electrode including a positive electrode active material, a negative electrode including a negative electrode active material, a separator disposed between the positive electrode and the negative electrode, and the above-described electrolyte.

In this case, the lithium secondary battery of the present invention may be prepared according to a conventional method known in the art. For example, after an electrode assembly is formed by sequentially stacking a positive electrode, a negative electrode, and a separator disposed between the positive electrode and the negative electrode, the lithium secondary battery of the present invention may be prepared by inserting the electrode assembly into a battery case, injecting the composition for a gel polymer electrolyte according to the present invention, and then performing in-situ polymerization.

In this case, since the gel polymer electrolyte is the same as described above, a detailed description thereof will be omitted.

(1) Positive Electrode

The positive electrode may be prepared by coating a positive electrode collector with a positive electrode material mixture slurry including a positive electrode active material, a binder, a conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. More specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_zO_4$ (where 0<Z<2), etc.), lithium-nickel-cobalt-based oxide (e.g., $LiNi_{1-Y1}Co_{Y1}O_2$ (where 0<Y1<1), etc.), lithium-manganese-cobalt-based oxide (e.g., $LiC_{O1-Y2}Mn_{Y2}O_2$ (where 0<Y2<1), $LiMn_{2-Z1}Co_{z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.), and, in consideration of a significant improvement due to the control of type and content ratio of elements constituting the lithium composite metal oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and any one thereof or a mixture of two or more thereof may be used.

The positive electrode active material may be included in an amount of 60 wt % to 99 wt %, preferably 70 wt % to 99 wt %, and more preferably 80 wt % to 98 wt % based on a total weight of solids excluding the solvent in the positive electrode material mixture slurry.

The binder is a component that assists in the binding between the active material and the conductive agent and in the binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene monomer, a sulfonated ethylene-propylene-diene monomer, a styrene-butadiene rubber, a fluoro rubber, various copolymers, and the like.

The binder may be commonly included in an amount of 1 wt % to 20 wt %, preferably 1 wt % to 15 wt %, and more preferably 1 wt % to 10 wt % based on the total weight of solids excluding the solvent in the positive electrode material mixture slurry.

The conductive agent is a component for further improving the conductivity of the positive electrode active material.

The conductive agent is not particularly limited as long as it has conductivity without causing adverse chemical changes in the battery, and, for example, a conductive material, such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent may be commonly included in an amount of 1 wt % to 20 wt %, preferably 1 wt % to 15 wt %, and more preferably 1 wt % to 10 wt % based on the total weight of solids excluding the solvent in the positive electrode material mixture slurry.

The solvent may include an organic solvent, such as N-methyl-2-pyrrolidone (NMP), and may be used in an amount such that desirable viscosity is obtained when the positive electrode active material as well as optionally the binder and the conductive agent are included. For example, the solvent may be included in an amount such that a concentration of a solid content including the positive electrode active material as well as optionally the binder and the conductive agent is in a range of 50 wt % to 95 wt %, preferably 70 wt % to 95 wt %, and more preferably 70 wt % to 90 wt %.

(2) Negative Electrode

The negative electrode, for example, may be prepared by coating a negative electrode collector with a negative electrode material mixture slurry including a negative electrode active material, a binder, a conductive agent, and a solvent.

For example, in a case in which the negative electrode is prepared by coating the negative electrode collector with the negative electrode material mixture slurry, the negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

The negative electrode active material may include a carbon-based material capable of reversibly intercalating/deintercalating lithium ions or a silicon-based compound which may be doped and undoped with lithium.

First, as the carbon-based material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used.

Examples of the crystalline carbon may be graphite such as irregular, planar, flaky, spherical, or fibrous natural graphite or artificial graphite. Examples of the amorphous carbon may be soft carbon (low-temperature sintered carbon) or hard carbon, mesophase pitch carbide, and fired cokes. Specifically, natural graphite or artificial graphite may be used as the carbon-based negative electrode active material.

Also, the silicon-based compound, which may be doped and undoped with lithium, may include at least one selected from silicon (Si), $SiO_x$ ($0<x\leq2$), and a Si—Y alloy (where Y is an element selected from the group consisting of alkali metal, alkaline earth metal, a Group 13 element, a Group 14 element excluding Si, transition metal, a rare earth element, and a combination thereof). Furthermore, a mixture of Sift and at least one thereof may also be used. The element Y may be selected from the group consisting of Mg, calcium (Ca), strontium (Sr), barium (Ba), radium (Ra), scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and a combination thereof. Specifically, $SiO_x$ ($0<x\leq2$) may be used as the silicon-based compound.

The negative electrode active material may be included in an amount of 60 wt % to 99 wt %, preferably 70 wt % to 99 wt %, and more preferably 80 wt % to 98 wt % based on a total weight of solids excluding the solvent in the negative electrode material mixture slurry.

The binder is a component that assists in the binding between the conductive agent, the active material, and the current collector. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber, a fluoro rubber, and various copolymers thereof.

The binder may be commonly included in an amount of 1 wt % to 20 wt %, preferably 1 wt % to 15 wt %, and more preferably 1 wt % to 10 wt % based on the total weight of solids excluding the solvent in the negative electrode material mixture slurry.

The conductive agent is a component for further improving the conductivity of the negative electrode active material. The conductive agent is not particularly limited as long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent may be included in an amount of 1 wt % to 20 wt %, preferably 1 wt % to 15 wt %, and more preferably 1 wt % to 10 wt % based on the total weight of solids excluding the solvent in the negative electrode material mixture slurry.

The solvent may include water or an organic solvent, such as N-methyl-2-pyrrolidone (NMP), and may be used in an amount such that desirable viscosity is obtained when the negative electrode active material as well as optionally the binder and the conductive agent are included. For example, the solvent may be included in an amount such that a concentration of a solid content including the negative electrode active material as well as optionally the binder and the conductive agent is in a range of 50 wt % to 95 wt %, for example, 70 wt % to 90 wt %.

Also, a graphite electrode formed of carbon (C) may be used as the negative electrode, or a metal itself may be used as the negative electrode.

In a case in which the metal itself is used as the negative electrode, the negative electrode may be prepared from a metal thin film itself or by bonding, rolling, or depositing a metal on the negative electrode collector by an electrical deposition method or chemical vapor deposition. The metal thin film itself or the metal bonded/rolled/deposited on the negative electrode collector may include one metal selected from the group consisting of lithium (Li), nickel (Ni), tin (Sn), copper (Cu), and indium (In) or an alloy of two metals thereof (3) Separator Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

According to another embodiment of the present invention, a battery module including the lithium secondary battery as a unit cell and a battery pack including the battery module are provided. Since the battery module or the battery pack includes the lithium secondary battery having high capacity, high rate capability, and high cycle characteristics, the battery module or the battery pack may be used as a power source of a medium and large sized device selected from the group consisting of an electric vehicle, a hybrid electric vehicle, a plug-in hybrid electric vehicle, and a power storage system.

Hereinafter, the present invention will be described in more detail, according to specific examples. However, the following examples are merely presented to exemplify the present invention, and the scope of the present invention is not limited thereto. It will be apparent to those skilled in the art that various modifications and alterations are possible within the scope and technical spirit of the present invention. Such modifications and alterations fall within the scope of claims included herein.

EXAMPLES

[Preparation of Copolymer for Polymer Electrolyte]

Example 1

(Step 1) 6.5 g of polychlorotrifluoroethylene (PCTFE, manufactured by Polymerscience, product name: Halocarbon 1000 N) as a fluorine-based polymer, 7 g of pentenyl acrylate (Pent-4-en-1-yl acrylate), and 60 mL of dimethylformamide (DMF), as a solvent, were added to a 250 mL flask and stirred for 1 hour under nitrogen conditions.

(Step 2) Subsequently, after 0.0043 g of $CuCl_2$ as an ATRP reaction catalyst, 0.019 g of TPMA as a ligand, and 0.12 g of azobisisobutyronitrile (AIBN), as a reducing agent, were added to the flask, an ATRP polymerization reaction was performed while stirring at 60° C. for 48 hours under nitrogen conditions. In this case, a monomer conversion rate was 50%.

(Step 3) After the reaction was completed, a polymer thus formed was passed through a short alumina column, added to a purification solvent (diethyl ether:hexane=1:2 volume ratio), and then re-precipitated at −30° C. or less to remove unreacted monomers and DMF, which did not participate in the reaction, and other impurities. The obtained polymer was dried under vacuum conditions for 24 hours to obtain polychlorotrifluoroethylene-g-poly(pentenyl acrylate) (PCTFE-g-PA)(A1) (weight ratio of q1':q2'=1:0.02 (99.8:0.2), weight-average molecular weight (Mw): 20,000, Mw/Mn (PDI: Poly Dipersity Index: polydispersity index)=1.2)) (see Table 1 below).

Example 2

(Step 1) 5 g of PCTFE (manufactured by Polymerscience, product name: Halocarbon 1000 N) as a fluorine-based polymer, 52 g of butyl acrylate (BA), and 3 g of 4-hydroxybutyl acrylate (HBA) were added to 60 mL of dimethylformamide (DMF), as a solvent, in a 250 mL flask and stirred for 1 hour under nitrogen conditions.

(Step 2) Subsequently, after 0.0043 g of $CuCl_2$ as an ATRP reaction catalyst, 0.019 g of TPMA as a ligand, and 0.12 g of azobisisobutyronitrile (AIBN), as a reducing agent, were added, an ATRP polymerization reaction was performed while stirring at 60° C. for 48 hours under nitrogen conditions. In this case, a monomer conversion rate was 50%. The polymerization reaction was terminated by air bubbling while the temperature of the reactant was maintained at 60° C., and 0.0015 g of butylated hydroxytoluene (BHT), as a polymerization inhibitor, was added. Subsequently, 0.13 g of dibutyltin dilaurate (DBTDL) and 2.94 g of 2-acryloyloxyethyl isocyanate (A00 were added, and a condensation reaction was performed for 24 hours.

(Step 3) After the reaction was completed, a polymer thus formed was passed through a short alumina column, added to a purification solvent (diethyl ether:hexane=1:2 volume ratio), and then re-precipitated at −30° C. or less to remove unreacted monomers and DMF, which did not participate in the reaction, and other impurities. The obtained polymer was dried under vacuum conditions for 24 hours to obtain polychlorotrifluoroethylene-g-poly (butyl acrylate-r-hydroxybutylacrylate-r-acryloyloxyethyl isocyanate) (PCTFE-g-P(BA-r-HBA-r-AOI))(A2) (weight ratio of q1':q2'=1:0.02 (99.8:0.2), weight-average molecular weight (Mw): 24,000, Mw/Mn (PDI: Poly Dipersity Index: polydispersity index)=1.2)) (see Table 1 below).

Example 3

(Step 1) 2.5 g of PCTFE (manufactured by Polymerscience, product name: Halocarbon 1000 N) as a fluorine-based polymer, 52 g of butyl acrylate (BA), and 3 g of 4-hydroxybutyl acrylate (HBA) were added to 60 mL of dimethylformamide (DMF), as a solvent, in a 250 mL flask and stirred for 1 hour under nitrogen conditions.

(Step 2) Subsequently, after 0.0043 g of $CuCl_2$ as an ATRP reaction catalyst, 0.019 g of TPMA as a ligand, and 0.12 g of azobisisobutyronitrile (AIBN), as a reducing agent, were added to the flask, an ATRP polymerization reaction was performed while stirring at 60° C. for 48 hours under nitrogen conditions. In this case, a monomer conversion rate was 50%. The polymerization reaction was terminated by air bubbling while the temperature of the reactant was maintained at 60° C., and 0.0015 g of butylated hydroxytoluene, as a polymerization inhibitor, was added. Subsequently, 0.13 g of dibutyltin dilaurate (DBTDL) and 2.94 g of 2-acryloyloxyethyl isocyanate (A00 were added, and a condensation reaction was performed for 24 hours.

(Step 3) After the reaction was completed, a polymer thus formed was passed through a short alumina column, added to a purification solvent (diethyl ether:hexane=1:2 volume ratio), and then re-precipitated at −30° C. or less to remove unreacted monomers and DMF, which did not participate in the reaction, and other impurities. The obtained polymer was dried under vacuum conditions for 24 hours to obtain polychlorotrifluoroethylene-g-poly (butyl acrylate-r-hydroxybutylacrylate-r-acryloyloxyethyl isocyanate) (PCTFE-g-P(BA-r-HBA-r-AOI))(A3) (weight ratio of q1':q2'=1:0.02 (99.8:0.2), weight-average molecular weight (Mw): 34,000, Mw/Mn (PDI: Poly Dipersity Index: polydispersity index)=1.6)) (see Table 1 below).

Example 4

(Step 1) 5 g of PCTFE (manufactured by Polymerscience, product name: Halocarbon 1000 N) as a fluorine-based polymer, 26 g of ethoxyethyl acrylate (2-(2-ethoxyethoxy) ethyl acrylate, EEA), 23 g of butyl acrylate (BA), and 3 g of 4-hydroxybutyl acrylate (HBA) were added to 60 mL of dimethylformamide (DMF), as a solvent, in a 250 mL flask and stirred for 1 hour under nitrogen conditions.

(Step 2) Subsequently, after 0.0035 g of $CuCl_2$ as an ATRP reaction catalyst, 0.015 g of TPMA as a ligand, and 0.10 g of azobisisobutyronitrile (AIBN), as a reducing agent, were added to the flask, an ATRP polymerization reaction was performed while stirring at 60° C. for 48 hours under nitrogen conditions. In this case, a monomer conversion rate was 55%. The polymerization reaction was terminated by air bubbling while the temperature of the reactant was maintained at 60° C., and 0.0015 g of butylated hydroxytoluene, as a polymerization inhibitor, was added. Subsequently, 0.13 g of dibutyltin dilaurate (DBTDL) and 2.94 g of 2-acryloyloxyethyl isocyanate (A00 were added, and a condensation reaction was performed for 24 hours.

(Step 3) After the reaction was completed, a polymer thus formed was passed through a short alumina column, added to a purification solvent (diethyl ether:hexane=1:2 volume ratio), and then re-precipitated at −30° C. or less to remove unreacted monomers and DMF, which did not participate in the reaction, and other impurities. The obtained polymer was dried under vacuum conditions for 24 hours to obtain polychlorotrifluoroethylene-g-poly (butyl acrylate-r-ethoxyethylacrylate-r-hydroxybutylacrylate-r-acryloyloxyethyl isocyanate) (PCTFE-g-P(BA-r-EEA-r-HBA-r-AOI))(A4) (weight ratio of q1':q2'=1:0.02 (99.8:0.2), weight-average molecular weight (Mw): 26,000, Mw/Mn (PDI: Poly Dipersity Index: polydispersity index)=1.3)) (see Table 1 below).

Example 5

(Step 1) 6.0 g of PVDF-PCTFE-PTrFE (manufactured by Polymerscience), as a fluorine-based polymer, and 7.5 g of butyl acrylate (BA) were added to 60 mL of dimethylformamide (DMF), as a solvent, in a 250 mL flask and stirred for 1 hour under nitrogen conditions.

(Step 2) Subsequently, after 0.0035 g of $CuCl_2$ as an ATRP reaction catalyst, 0.015 g of TPMA as a ligand, and 0.10 g of azobisisobutyronitrile (AIBN), as a reducing agent, were added to the flask, an ATRP polymerization reaction was performed while stirring at 60° C. for 48 hours under nitrogen conditions. In this case, a monomer conversion rate was 55%.

(Step 3) After the reaction was completed, a polymer thus formed was passed through a short alumina column, added to a purification solvent (diethyl ether:hexane=1:2 volume ratio), and then re-precipitated at −30° C. or less to remove unreacted monomers and DMF, which did not participate in the reaction, and other impurities. The obtained polymer was dried under vacuum conditions for 24 hours to obtain PVDF-co-(PCTFE-g-P(BA))-co-PTrFE(A5) (weight ratio of q1':o1:p1:q2'=50:20:25:5, weight-average molecular weight (Mw): 12,000, Mw/Mn (PDI: Poly Dipersity Index: polydispersity index)=1.2)) (see Reaction Formula 1 and Table 1 below).

[Reaction Formula 1]

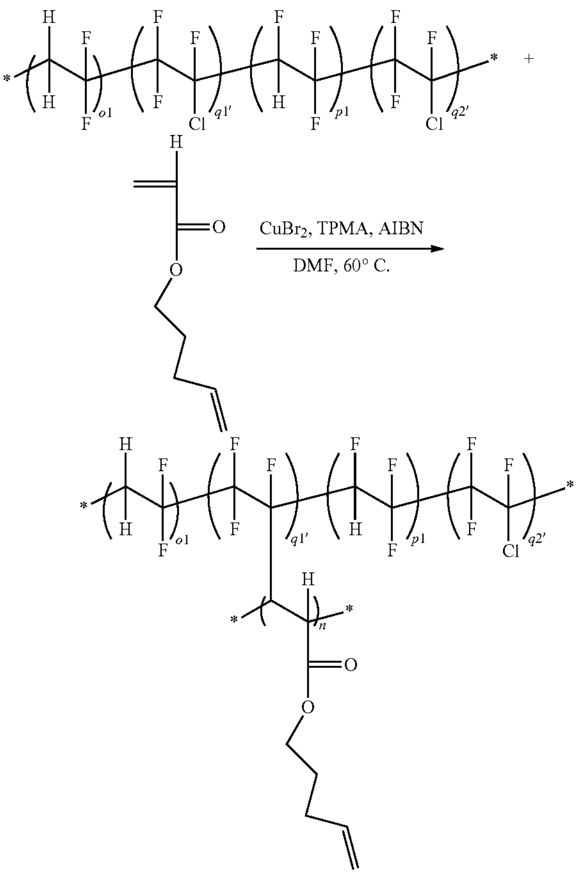

Example 6

(Step 1) 6.0 g of PVDF-PCTFE (manufactured by Polymerscience), as a fluorine-based polymer, and 7.5 g of butyl acrylate (BA) were added to 60 mL of dimethylformamide (DMF), as a solvent, in a 250 mL flask and stirred for 1 hour under nitrogen conditions.

(Step 2) Subsequently, after 0.0035 g of $CuCl_2$ as an ATRP reaction catalyst, 0.015 g of TPMA as a ligand, and 0.10 g of azobisisobutyronitrile (AIBN), as a reducing agent, were added to the flask, an ATRP polymerization reaction was performed while stirring at 60° C. for 96 hours under nitrogen conditions. In this case, a monomer conversion rate was 65%.

(Step 3) After the reaction was completed, a polymer thus formed was passed through a short alumina column, added to a purification solvent (diethyl ether:hexane=1:2 volume ratio), and then re-precipitated at −30° C. or less to remove unreacted monomers and DMF, which did not participate in the reaction, and other impurities. The obtained polymer was dried under vacuum conditions for 24 hours to obtain PVDF-co-(PCTFE-g-P(BA))(A6) (weight ratio of q1':o1: q2'=68:25:7, weight-average molecular weight (Mw): 25,000, Mw/Mn (PDI: Poly Dipersity Index: polydispersity index)=1.2)) (see Table 1 below).

Comparative Example 1. Linear Copolymer Preparation (B1)

(Step 1) 26 g of ethoxyethyl acrylate (EEA), 23 g of butyl acrylate (BA), 3 g of HBA, and 0.26 g of dodecyl mercaptan, as a chain transfer agent, were added to 200 mL of DMF, as a solvent, in a 500 ml flask and stirred for 1 hour under nitrogen conditions.

(Step 2) 0.25 g of AIBN, as a radical initiator, was added and an ATRP polymerization reaction was performed while stirring at 70° C. for 20 hours under nitrogen conditions. In this case, a monomer conversion rate was 95%. The polymerization reaction was terminated by air bubbling while the temperature of the reactant was maintained at 60° C., and 0.0015 g of butylated hydroxytoluene, as a polymerization inhibitor, was added. Subsequently, 0.13 g of dibutyltin dilaurate (DBTDL) and 2.94 g of 2-acryloyloxyethyl isocyanate (AOI) were added, and a condensation reaction was performed for 24 hours.

(Step 3) After the reaction was completed, a polymer thus formed was passed through a short alumina column, added to a purification solvent (diethyl ether:hexane=1:2 volume ratio), and then re-precipitated at −30° C. or less to remove unreacted monomers and DMF, which did not participate in the reaction, and other impurities. The obtained polymer was dried under vacuum conditions for 24 hours to obtain an EEA/BA/HBA/AOI linear polymer (B1) (weight-average molecular weight (Mw) 28,000, Mw/Mn (PDI: Poly Dipersity Index: polydispersity index)=1.6)). The results thereof are presented in Table 1 below (see Table 1 below).

Comparative Example 2. Linear Copolymer Preparation (B2)

(Step 1) 0.2 g of 2,2'-azobis(isobutyronitrile) (AIBN), as a polymerization initiator, was added to 60 mL of 1,1,2-trichlorotrifluoroethane, as a solvent, in a 250 mL flask and stirred for 1 hour in a reactor cooled at −15° C. under nitrogen conditions.

(Step 2) Subsequently, 8 g of vinylidene fluoride (VDF) and 2 g of hexafluoropropylene (HFP) were added, respectively. After stirring was performed for 24 hours while the temperature was maintained at 65° C. to initiate radical polymerization, the solvent was removed by using a rotary vacuum evaporator, washing was performed several times with methanol, and the obtained polymer was dried to prepare a PVDF-co-HFP polymer(B2) (weight-average molecular weight (Mw) 55,000, Mw/Mn (PDI: Poly Dipersity Index: polydispersity index)=1.1)) (see Table 1 below).

Comparative Example 3. Linear Copolymer Preparation (B3)

(Linear Copolymer Preparation)

After 2,455 g of demineralized water and 0.63 g of a METHOCEL® K100 GR suspending agent were sequentially introduced into a 4-liter reactor, the reactor was evacuated and pressurized with 1 bar of nitrogen, and 8.55 g of a polymerization initiator (75 vol % t-amyl per(pivalate)) dissolved in isododecane, 107 g of hexafluoropropylene (HFP), and 947 g of vinylidene fluoride (VDF) were then added to the reactor. Subsequently, after the reactor was gradually heated to 52° C. to reach a final pressure of 110 bar, 19.96 g/l of a hydroxyethyl acrylate (HEA) aqueous solution was added in a state in which the temperature was maintained at 55° C. A polymerization reaction was performed by stirring for 8 hours and 50 minutes under a pressure of 110 bar.

After completion of the polymerization reaction, the solvent was removed by using a rotary vacuum evaporator, washing was performed several times with methanol, and the obtained polymer was dried to prepare a linear VDF-HFP-HEA polymer (quantity obtained: 1,025 g (yield: 42%), weight-average molecular weight (Mw): 67,000, 2.3 mol % of HFP and 1.0 mol % of HEA).

(Preparation of Linear Copolymer Containing Metal Pendant Group)

30 mL of N-methyl-2-pyrrolidone (NMP) and 0.65 g of lithium perchlorate were stirred at room temperature until completely dissolved to obtain a clear single-phase $LiClO_4$ solution with a concentration of 0.2 M dissolved in NMP.

Then, after 6 g of the above-prepared linear VDF-HFP-HEA polymer was added to the solution at room temperature and dissolved, 6 g of tetraethylorthosilicate (TEOS) and 6 mL of a 0.1 M HCl aqueous solution were added dropwise in small amounts while stirring.

After mixing at 60° C. for about 1 hour, the TEOS was completely hydrolyzed/polycondensed into $SiO_2$, and a linear fluorine-based polymer (PVDF-HFP-HEA) containing a $SiO_2$ pendant group was obtained.

Comparative Example 4. Linear Copolymer Preparation (B4)

7,800 g of ion-exchanged water, 4.2 g of methylcellulose (Shin-Etsu Chemical Co., Ltd., METOLOSE SM-100), 3.3 g of acryloyloxydiethyl succinic acid (AES), 25.5 g of a 50 wt % di-i-propylperoxydicarbonate (IPP)-freon solution, 2,700 g of vinylidene fluoride (VDF), and 300 g of HFP were added to a reactor, and the mixture was stirred while the temperature was increased to 29° C.

Then, 32.1 g of a 50 wt % acryloyloxydiethyl succinic acid-methanol solution was slowly added at a rate of 0.1 g/min and stirred at 29° C. for 23 hours to perform a polymerization reaction.

After termination of the polymerization reaction, the solvent was removed from a polymer slurry by using a rotary vacuum evaporator, washing was performed several times with methanol, and the obtained polymer was dried to prepare a linear fluorine-based polymer (VDF-HFP-AES) (yield: 46%, polymerization rate: 84%, inherent viscosity: 2.12 dl/g, weight-average molecular weight (Mw): 35,000, VDF: 96.73 mol %, HFP: 2.95 mol %, AES: 0.32 mol %).

Comparative Example 5

7.0 g of PVDF (manufactured by Polymerscience) was dissolved in N-methyl-2-pyrrolidone (NMP) in a reactor, and an oxidation reaction for PVDF was performed at 70° C. for 24 hours under oxygen bubbling.

Then, after 7.5 g of polyethylene glycol diacrylate having a weight-average molecular weight of 1,100 was added to the reactor and a polymerization reaction was performed at 70° C. for about 12 hours, the solvent was removed by using a rotary vacuum evaporator after termination of the polymerization reaction.

Then, washing was performed several times with methanol, and the obtained polymer was dried to prepare a polymer (PVDF-g-PEGDA) containing polyvinylidene fluoride, as a main chain, and polyethylene glycol diacrylate as a pendant group (weight ratio of fluorine-based polymer main chain:polyethylene glycol diacrylate unit=70:30, yield: 45%, polymerization rate: 55%, weight-average molecular weight (Mw): 150,000).

TABLE 1

| | Main chain (A) (fluorine-based polymer) | Grafted unit (B) Type | Grafted unit (B) Weight ratio | Weight ratio of A:B |
|---|---|---|---|---|
| Example 1 | PCTFE | PA | — | 15:85 |
| Example 2 | PCTFE | BA/HBA/AOI | 50:44:6 | 15:85 |
| Example 3 | PCTFE | BA/HBA/AOI | 50:44:6 | 8:92 |
| Example 4 | PCTFE | EEA/BA/HBA/AOI | 30:20:44:6 | 15:85 |
| Example 5 | PVDF-PCTFE-PTrFE | BA | — | 15:85 |
| Example 6 | PVDF-PCTFE | BA | — | 10:90 |
| Comparative Example 1 | — | EEA/BA/HBA/AOI | 30:20:44:6 | 0:100 |
| Comparative Example 2 | PVDF-HFP | — | — | 100:0 |
| Comparative Example 3 | VDF-HFP-HEA | — | — | 100:0 |
| Comparative Example 4 | VDF-HFP-AES | — | — | 100:0 |
| Comparative Example 5 | PVDF | EGDMA | — | 70:30 |

[Secondary Battery Preparation]

Example 7

(Composition for Polymer Electrolyte)

A composition for a polymer electrolyte was prepared by adding 1 g of the copolymer(A1) of Example 1, 0.5 g of a polymerization initiator (AIBN), and 3 g of vinylene carbonate, as an additive, to 95.5 g of an organic solvent (ethylene carbonate (EC):ethyl methyl carbonate (EMC) =3:7 volume ratio) in which 1 M $LiPF_6$ was dissolved.

(Lithium Secondary Battery Preparation)

97.5 wt % of a positive electrode active material ($LiNi_{0.8}Co_{0.1}Mn_{0.1}O_2$; NCM), 1.5 wt % of carbon black as a conductive agent, and 1 wt % of PVDF, as a binder, were added to N-methyl-2-pyrrolidone (NMP), as a solvent, to prepare a positive electrode material mixture slurry. An about 20 μm thick A1 thin film, as a positive electrode collector, was coated with the positive electrode material mixture slurry, dried, and then roll-pressed to prepare a positive electrode.

An artificial graphite electrode was used as a negative electrode.

After an electrode assembly was prepared by inserting a separator formed of polyethylene (PE) between the positive electrode and the negative electrode, the electrode assembly was accommodated in a battery case and, after the above-prepared composition for a gel polymer electrolyte was injected, the electrode assembly was left standing for 2 days and then heated at 60° C. for 24 hours to prepare a lithium secondary battery including a gel polymer electrolyte.

Example 8

A composition for a polymer electrolyte and a lithium secondary battery including a gel polymer electrolyte prepared by polymerization of the composition were prepared in the same manner as in Example 7 except that the copolymer (A2) of Example 2, instead of the copolymer of Example 1, was used.

Example 9

A composition for a polymer electrolyte and a lithium secondary battery including a gel polymer electrolyte prepared by polymerization of the composition were prepared in the same manner as in Example 7 except that the copolymer (A3) of Example 3, instead of the copolymer of Example 1, was used.

Example 10

A composition for a polymer electrolyte was prepared by adding 2 g of the copolymer(A1) of Example 1, 0.5 g of a polymerization initiator (AIBN), and 2 g of vinylene carbonate, as an additive, to 95.5 g of an organic solvent (EC:EMC=3:7 volume ratio) in which 1 M $LiPF_6$ was dissolved (see Table 2 below).

A lithium secondary battery was prepared in the same manner as in Example 7 except that the composition for a polymer electrolyte was included.

Example 11

A composition for a polymer electrolyte was prepared by adding 0.01 g of the copolymer(A5) of Example 5, 0.5 g of a polymerization initiator (AIBN), and 2 g of vinylene carbonate, as an additive, to 97.49 g of an organic solvent (EC:EMC=3:7 volume ratio) in which 1 M $LiPF_6$ was dissolved (see Table 2 below).

A lithium secondary battery was prepared in the same manner as in Example 7 except that the composition for a polymer electrolyte was included.

Example 12

A composition for a polymer electrolyte was prepared by adding 10 g of the copolymer(A5) of Example 5, 0.5 g of a polymerization initiator (AIBN), and 2 g of vinylene carbonate, as an additive, to 87.5 g of an organic solvent (EC:EMC=3:7 volume ratio) in which 1 M $LiPF_6$ was dissolved (see Table 2 below).

A lithium secondary battery was prepared in the same manner as in Example 7 except that the composition for a polymer electrolyte was included.

Example 13

A composition for a polymer electrolyte was prepared by adding 30 g of the copolymer(A5) of Example 5, 0.5 g of a polymerization initiator (AIBN), and 2 g of vinylene carbonate, as an additive, to 67.5 g of an organic solvent (EC:EMC=3:7 volume ratio) in which 1 M $LiPF_6$ was dissolved (see Table 3 below).

A lithium secondary battery was prepared in the same manner as in Example 7 except that the composition for a polymer electrolyte was included.

Example 14

A composition for a polymer electrolyte was prepared by adding 25 g of the copolymer(A5) of Example 5, 0.5 g of a polymerization initiator (AIBN), and 2 g of vinylene carbonate, as an additive, to 72.5 g of an organic solvent (ethylene carbonate (EC):ethyl methyl carbonate (EMC)=3:7 volume ratio) in which 1 M $LiPF_6$ was dissolved (see Table 2 below).

A lithium secondary battery was prepared in the same manner as in Example 7 except that the composition for a polymer electrolyte was included.

Example 15

A composition for a polymer electrolyte was prepared by adding 1 g of the copolymer(A6) of Example 6, 0.5 g of a polymerization initiator (AIBN), and 2 g of vinylene carbonate, as an additive, to 96.5 g of an organic solvent (ethylene carbonate (EC):ethyl methyl carbonate (EMC) =3:7 volume ratio) in which 1 M $LiPF_6$ was dissolved (see Table 2 below).

A lithium secondary battery was prepared in the same manner as in Example 7 except that the composition for a polymer electrolyte was included.

Example 16

A composition for a polymer electrolyte was prepared by adding 1 g of the copolymer(A5) of Example 5, 0.5 g of a polymerization initiator (AIBN), and 2 g of vinylene carbonate, as an additive, to 96.5 g of an organic solvent (ethylene carbonate (EC):ethyl methyl carbonate (EMC) =3:7 volume ratio) in which 1 M $LiPF_6$ was dissolved (see Table 2 below).

A lithium secondary battery was prepared in the same manner as in Example 7 except that the composition for a polymer electrolyte was included.

Example 17

A composition for a polymer electrolyte and a lithium secondary battery including a gel polymer electrolyte prepared by polymerization of the composition were prepared in the same manner as in Example 7 except that the copolymer (A4) of Example 4, instead of the copolymer of Example 1, was used.

Comparative Example 6

A composition for a polymer electrolyte and a lithium secondary battery including a gel polymer electrolyte prepared by polymerization of the composition were prepared in the same manner as in Example 7 except that the copolymer (B1) prepared in Comparative Example 1, instead of the copolymer of Example 1, was used.

Comparative Example 7

A composition for a polymer electrolyte and a lithium secondary battery including a gel polymer electrolyte prepared by polymerization of the composition were prepared in the same manner as in Example 7 except that the copolymer (B2) prepared in Comparative Example 2, instead of the copolymer of Example 1, was used.

Comparative Example 8

After 7 g of the copolymer prepared in Comparative Example 3 and 2 g of $SiO_2$ were dispersed in 10 g of NMP, the dispersion was coated on a Teflon sheet and dried at 60° C. for 24 hours to form an electrolyte layer having a thickness of 20 μm.

(Lithium Secondary Battery Preparation)

After a cell was prepared by stacking the prepared electrolyte layer between the positive electrode and the negative electrode, an electrolyte solution (EC/EMC=3/7, 1 M $LiPF_6$, 3% VC, 0.1% AIBN) was injected. The cell after completion of the injection was left standing for 2 days and then heated at 60° C. for 24 hours to prepare a lithium secondary battery including a gel polymer electrolyte.

Comparative Example 9

A lithium secondary battery was prepared in the same manner as in Comparative Example 8 except that the copolymer of Comparative Example 4, instead of the copolymer of Comparative Example 3, was used.

Comparative Example 10

A lithium secondary battery was prepared in the same manner as in Comparative Example 8 except that the copolymer of Comparative Example 5, instead of the copolymer of Comparative Example 3, was used.

EXPERIMENTAL EXAMPLES

Experimental Example 1. Viscosity Evaluation of Composition for Polymer Electrolyte Viscosities of the compositions for polymer electrolytes prepared in Examples 7 to 11, 15, and 16 and the composition for a polymer electrolyte prepared in Comparative Example 6 were measured using a viscometer (Viscometer TV-22 by Toki Sangyo Co., Ltd.) at 25° C., and the results thereof are presented in Table 2 below.

Experimental Example 2. Ionic Conductivity Evaluation of Composition for Polymer Electrolyte (1)

Specimens were prepared by using the compositions for polymer electrolytes prepared in Examples 7 to 12 and 14 to 17 and the composition for a polymer electrolyte prepared in Comparative Example 6. The specimens were collectively prepared according to ASTM standard D638 (Type V specimens).

Subsequently, a circular gold (Au) electrode having a diameter of 1 mm was coated on the specimens using a sputtering method, and ionic conductivities were measured at 25° C. by using an alternating current impedance method. The ionic conductivities were measured in a frequency range of 0.1 Hz to 100 MHz using a VMP3 measurement instrument and a precision impedance analyzer (4294A). The measurement results are presented in Table 2 below.

TABLE 2

| | Copolymer | | | | |
|---|---|---|---|---|---|
| | Copolymer | Weight-average molecular weight (Mw) | Amount (wt %) | Viscosity (cP) | Ionic conductivity (S/cm) |
| Example 7 | A1 | 20,000 | 1 | 4.1 | $9.0 \times 10^{-3}$ |
| Example 8 | A2 | 24,000 | 1 | 4.4 | $8.8 \times 10^{-3}$ |
| Example 9 | A3 | 34,000 | 1 | 4.7 | $8.6 \times 10^{-3}$ |
| Example 10 | A1 | 20,000 | 2 | 4.3 | $8.7 \times 10^{-3}$ |
| Example 11 | A5 | 12,000 | 0.01 | 3.9 | $9.1 \times 10^{-3}$ |
| Example 12 | A5 | 12,000 | 10 | — | $7.02 \times 10^{-3}$ |
| Example 14 | A5 | 12,000 | 25 | — | $6.02 \times 10^{-3}$ |
| Example 15 | A6 | 25,000 | 1 | 4.8 | $8.66 \times 10^{-3}$ |
| Example 16 | A5 | 12,000 | 1 | 4.2 | $8.78 \times 10^{-3}$ |

TABLE 2-continued

| | Copolymer | | | | |
|---|---|---|---|---|---|
| | Copolymer | Weight-average molecular weight (Mw) | Amount (wt %) | Viscosity (cP) | Ionic conductivity (S/cm) |
| Example 17 | A4 | 26,000 | 1 | — | $8.40 \times 10^{-3}$ |
| Comparative Example 6 | B1 | 28,000 | 1 | 5.0 | $6.0 \times 10^{-3}$ |

Referring to Table 2, it may be understood that the viscosities of the compositions for polymer electrolytes prepared in Examples 7 to 11, 15, and 16 were 4.8 cp or less, but the viscosity of the composition for a polymer electrolyte of Comparative Example 6 including the same amount of the copolymer for a polymer electrolyte as Examples 7 to 9 was increased to 5.0 cp.

Also, referring to Table 2, the specimens prepared by using the compositions for polymer electrolytes of Examples 7 to 12 and 14 to 17 had an ionic conductivity at 25° C. of $6.02\times10^{-3}$ or more, but, with respect to the specimen prepared by using the composition for a polymer electrolyte prepared in Comparative Example 6, an ionic conductivity at 25° C. was $6.0\times10^{-3}$, wherein it may be understood that the ionic conductivity was reduced in comparison to those of the compositions for polymer electrolytes prepared in Examples 7 to 12 and 14 to 17. In this case, with respect to the composition for a polymer electrolyte of Example 14 in which the amount of the copolymer for a polymer electrolyte was large, since the viscosity was increased, it may be understood that the ionic conductivity was reduced in comparison to those of the compositions for polymer electrolytes prepared in Examples 7 to 12 and 14 to 17.

With respect to the polymers prepared in Comparative Examples 8 to 10, since the polymers were not dissolved in the electrolyte solution, specimens for evaluating ionic conductivity may not be prepared, and thus, viscosity and ionic conductivity measurements were not possible.

Experimental Example 3. Electrochemical Stability Evaluation

Electrochemical (oxidation) stability of each of the secondary batteries prepared in Examples 7 to 16 and the secondary batteries prepared in Comparative Examples 6 and 7 was measured using linear sweep voltammetry (LSV). The measurement was made by using a potentiostat (EG&G, model 270A) under a three-electrode system (working electrode: platinum disk, counter electrode: platinum, reference electrode: lithium metal), and measurement temperature was 60° C. The results thereof are presented in Table 3 below.

Experimental Example 4. Electrode Stability Evaluation

Each of the secondary batteries prepared in Examples 7 to 16 and the secondary batteries prepared in Comparative Examples 6 and 7 was fully charged to a state of charge (SOC) of 100% (44.3 mAh) under a voltage condition of 4.25 V. Thereafter, at 25° C., the temperature was increased to 120° C. at a rate of 0.7° C./min and then maintained in a temperature range of 120° C. for about 100 minutes (1$^{st}$ temperature maintenance section). Thereafter, the temperature was again increased to 150° C. at a rate of 0.7° C./min and then maintained in a temperature range of 150° C. for about 100 minutes (2$^{nd}$ temperature maintenance section). Thereafter, the temperature was again increased to 200° C. at a rate of 0.7° C./min and then maintained in a temperature range of 200° C. for about 100 minutes (3$^{rd}$ temperature maintenance section).

An internal calorific value of each lithium secondary battery exposed to the above-described temperature conditions was measured using a MMC instrument (Multiple Module calorimeter, MMC 274, NETZSCH), and the results thereof are presented in Table 3 below.

TABLE 3

| | Copolymer | | | | |
|---|---|---|---|---|---|
| | Copolymer | Weight-average molecular weight (Mw) | Amount (wt %) | OFF-Set voltage (V) | Battery calorific value (J/g) |
| Example 7 | A1 | 20,000 | 1 | 5.16 | 94 |
| Example 8 | A2 | 24,000 | 1 | 5.20 | 82 |
| Example 9 | A3 | 34,000 | 1 | 5.03 | 89 |
| Example 10 | A1 | 20,000 | 2 | 5.20 | 86 |
| Example 11 | A5 | 12,000 | 0.01 | 5.30 | 94 |
| Example 12 | A5 | 12,000 | 10 | 5.54 | 62 |
| Example 13 | A5 | 12,000 | 30 | 5.68 | 34 |
| Example 14 | A5 | 12,000 | 25 | 5.63 | 46 |
| Example 15 | A6 | 25,000 | 1 | 5.01 | 92 |
| Example 16 | A5 | 12,000 | 1 | 5.40 | 78 |
| Comparative Example 6 | B1 | 28,000 | 1 | 4.70 | 126 |
| Comparative Example 7 | B2 | 55,000 | 1 | Not measurable | |

Referring to Table 3, the secondary battery prepared in Comparative Example 6 had an oxidation initiation voltage of about 4.7 V, but the lithium secondary batteries prepared in Examples 7 to 16 of the present invention had an oxidation initiation voltage of about 5.01 V or more, wherein it was confirmed that the lithium secondary batteries prepared in Examples 7 to 16 of the present invention exhibited excellent electrochemical (oxidation) stabilities.

From these results, with respect to the lithium secondary batteries prepared in Examples 7 to 16 including the gel polymer electrolyte of the present invention, it may be confirmed that oxidation stabilities were improved in comparison to that of the secondary battery of Comparative Example 6.

Also, referring to Table 3, it may be understood that calorific values of the secondary batteries prepared in Examples 7 to 16 of the present invention were 94 J/g or less, but a calorific value of the secondary battery prepared in Comparative Example 6 was increased to 126 J/g.

With respect to the secondary battery of Example 14, it may be understood that the ionic conductivity was reduced due to the large amount of the copolymer for a polymer electrolyte, but the electrochemical stability and electrode stability were relatively improved.

With respect to the lithium secondary battery prepared in Comparative Example 7, since the copolymer(B2) for a polymer electrolyte was not uniformly dissolved in the solution of the composition for a polymer electrolyte, electrochemical stability and electrode stability may not be evaluated.

Experimental Example 5. Initial Capacity Evaluation

After each of the secondary battery prepared in Example 7 and the secondary batteries prepared in Comparative Examples 8 to 10 was activated at a CC of 0.1 C, degassing was performed.

Then, each secondary battery was charged at a CC of 0.33 C to 4.20 V under a constant current-constant voltage (CC-CV) charging condition at 25° C., then subjected to 0.05 C current cut-off, and discharged at 0.33 C under a CC condition to 2.5 V. The above charging and discharging were defined as one cycle and three cycles were performed.

Then, initial discharge capacity was measured using PNE-0506 charge/discharge equipment, and the results thereof are presented in Table 4 below.

TABLE 4

| | 25° C. initial discharge capacity (%) |
|---|---|
| Example 7 | 99.3 |
| Comparative Example 8 | 42.4 |
| Comparative Example 9 | 48.5 |
| Comparative Example 10 | 74.6 |

Referring to Table 4, initial discharge capacities of the secondary batteries prepared in Comparative Examples 8 to 10 were 74.6% or less, wherein it may be understood that the initial discharge capacities were significantly reduced in comparison to that of the secondary battery prepared in Example 7. Thus, it may be understood that the lithium secondary batteries prepared in Comparative Examples 8 to 10 had low initial capacities.

That is, with respect to the secondary batteries of Comparative Examples 8 and 9 having the electrolyte layer including the linear copolymer, ion transport properties were deteriorated due to rigidity of the polymer, and accordingly, the initial discharge capacities were also reduced.

With respect to the secondary battery of Comparative Example 10 which had the electrolyte layer including the copolymer grafted with the unit derived from the acrylate-based monomer, since the weight ratio of the unit derived from the acrylate-based monomer or the acrylate-based polymer to the fluorine-based polymer, as the main chain, was low at less than 60, the solubility of the copolymer for a polymer electrolyte in the solution of the composition for a polymer electrolyte is reduced while the surface energy of the copolymer for a polymer electrolyte is reduced and non-uniformity in the cell is caused, and thus, it may be understood that initial discharge capacity efficiency was reduced in comparison to that of the secondary battery of Example 7 while available $Li^+$ ions were lost.

What is claimed is:

1. A composition for a polymer electrolyte, comprising a copolymer, a non-aqueous electrolyte solution, and a polymerization initiator, wherein an amount of the copolymer is 25 wt % or more based on a total weight of the composition when a weight-average molecular weight of the copolymer is 12,000 g/mole, the amount of the copolymer is 0.01 wt % to 25 wt % based on the total weight of the composition when the weight-average molecular weight of the copolymer is less than 15,000 g/mole, and the amount of the copolymer is 0.01 wt % to 10 wt % based on the total weight of the composition when the weight-average molecular weight of the copolymer is greater than 100,000 g/mole and equal to or less than 200,000 g/mol, and the copolymer is represented by Formula 2:

[Formula 1]

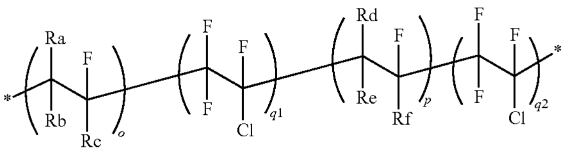

wherein, in Formula 2, $R_{a1}$ to $R_{f1}$ are each independently hydrogen, a fluorine element, or an alkyl group having 1 to 10 carbon atoms, $R_{4a}$ to $R_{4d}$ are each independently hydrogen or a substituted or unsubstituted alkyl group having 1 to 4 carbon atoms, $R_5$ is a substituted or unsubstituted alkylene group having 1 to 5 carbon atoms, $R_{6a}$ to $R_{6d}$ are each independently an alkyl group having 1 to 15 carbon atoms which is substituted or unsubstituted with at least one halogen element; an alkenyl group having 2 to 15 carbon atoms which is substituted or unsubstituted with at least one halogen element; a cyclic alkyl group having 3 to 10 carbon atoms; a heterocyclic group having 3 to 10 carbon atoms; a cyclic ether group having 3 to 10 carbon atoms; a heterocyclic ether group having 3 to 10 carbon atoms; $—(CH_2)_d—(CR_{18}R_{19})_e—OH$, wherein $R_{18}$ and $R_{19}$ are each independently hydrogen or an alkyl group having 1 to 5 carbon atoms, and d and e are each independently an integer of 0 to 10, but are not 0 at a same time; $—(R_7)_g—O—(R_8)_h—CH_3$, wherein $R_7$ and $R_8$ are each independently a substituted or unsubstituted alkylene group having 1 to 15 carbon atoms, and g and h each are an integer of 1 to 10; an aryl group having 6 to 12 carbon atoms; $—(CH_2)_f—CN$, wherein f is an integer of 0 to 10; $—(CH_2)_i—O—CH_2═CH_2$, wherein i is an integer of 0 to 10; $—(CH_2)_j—Si(R_{10})_k(OCH_2CH_3)_{3-k}$, wherein $R_{10}$ is hydrogen (H), j is an integer of 1 to 10, and k is an integer of 1 to 3; $—(CH_2)_w—NCO$, wherein w is an integer of 1 to 10; $—CH_2CH_2—N(CH_3)_2$; $—(CH_2)_x—A$, wherein A is $—OC(═O)(CH_2)_yCOOH$ (y is an integer of 1 to 10) or A is $—C(═O)(CH_2)_zCOOH$ (z is an integer of 1 to 10);

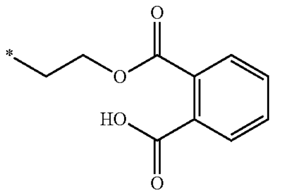

or

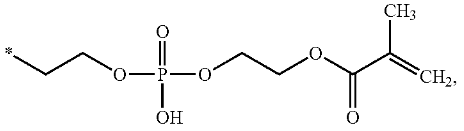

m is an integer of 0 to 10, o1 is an integer of 0 to 400, p1 is an integer of 0 to 400, q1' is an integer of 1 to 300, g2' is an integer of 0 to 300, with the proviso that o1 and q2' are not 0 at a same time, n is an integer of 1 to 2,000, n1 is an integer of 0 to 2,000, n2 is an integer of 0 to 2,000, and n3 is an integer of 0 to 2,000.

2. The composition of claim 1, further comprising a multifunctional crosslinking agent.

3. The composition of claim 2, wherein the multifunctional crosslinking agent comprises at least one selected from the group consisting of an isocyanate crosslinking agent, an epoxy crosslinking agent, an aziridine crosslinking agent, an alcohol crosslinking agent, an amine-based crosslinking agent, and a vinyl-based crosslinking agent.

4. The composition of claim 1, further comprising at least one additive selected from the group consisting of vinylene carbonate, $LiBF_4$, vinylethylene carbonate, 1,3-propane sultone, 1,3-propene sultone, succinonitrile, adiponitrile, fluoroethylene carbonate, ethylene sulfate, $LiPO_2F_2$, methyl trimethylene sulfate, lithium difluorooxalatoborate (LiODFB), lithium bis-(oxalato)borate (LiBOB), tetraphenylborate, 3-trimethoxysilanyl-propyl-N-aniline, tris(trimethylsilyl)phosphite, tris(2,2,2-trifluoroethyl) phosphate, and tris (trifluoroethyl)phosphite.

5. A gel polymer electrolyte prepared by thermal polymerization of the composition of claim 1.

6. A lithium secondary battery comprising the gel polymer electrolyte of claim 5.

7. The composition of claim 1, wherein the polymerization initiator includes a polymerization initiator selected from the group consisting of 2-hydroxy-2-methylpropiophenone (HMPP), 1-hydroxy-cyclohexylphenyl-ketone, benzophenone, 2-hydroxy-1-[4-(2-hydroxyethoxy)phenyl]-2-methyl-1-propanone, oxy-phenylacetic acid 2-[2-oxo-2-phenyl-acetoxy-ethoxy]-ethyl ester, oxy-phenyl-acetic 2-[2-hydroxyethoxy]-ethyl ester, alpha-dimethoxy-alpha-phenylacetophenone, 2-benzyl-2-(dimethylamino)-1-[4-(4-morpholinyl)phenyl]-1-butanone, 2-methyl-1-[4-(methylthio)phenyl]-2-(4-morpholinyl)-1-propanone, diphenyl(2,4,6-trimethylbenzoyl)-phosphine oxide, bis(2,4,6-trimethylbenzoyl) -phenylphosphine oxide, bis(eta 5-2,4-cyclopentadiene-1-yl), bis[2,6-difluoro-3-(1H-pyrrol-1-yl) phenyl]titanium, 4-isobutylphenyl-4'-methylphenyl iodonium, hexafluorophosphate, and methyl benzoylformate.

8. The composition of claim 1, wherein the polymerization initiator includes a thermal polymerization initiator selected from the group consisting of benzoyl peroxide, acetyl peroxide, dilauryl peroxide, di-tert-butyl peroxide, t-butyl peroxy-2-ethyl-hexanoate, cumyl hydroperoxide, hydrogen peroxide, 2,2'-azobis(2-cyanobutane), 2,2'-azobis (methylbutyronitrile), 2,2'-azobis(iso-butyronitrile) (AIBN), and 2,2'-azobisdimethyl-valeronitrile (AMVN).

9. The composition of claim 1, wherein an amount of the polymerization initiator is 0.01 part by weight to 5 parts by weight based on 100 parts by weight of the copolymer.

10. The composition of claim 2, wherein an amount of the multifunctional crosslinking agent is 1 part by weight to 1,000 parts by weight based on 100 parts by weight of the copolymer.

11. The composition of claim 1, wherein the copolymer includes at least one selected from the group consisting of:

polychlorotrifluoroethylene-g-poly(butyl acrylate);

polychlorotrifluoroethylene-g-poly(pentenyl acrylate);

polychlorotrifluoroethylene-g-poly(butyl acrylate-r-hydroxybutyl acrylate-r-acryloyloxyethyl isocyanate);

polychlorotrifluoroethylene-g-poly(butyl acrylate-r-ethoxyethyl acrylate-r-hydroxybutyl acrylate-r-acryloyloxyethyl isocyanate);

polychlorotrifluoroethylene-g-poly(butyl acrylate-r-tetrahydrofurfuryl acrylate);

polychlorotrifluoroethylene-g-poly(butyl acrylate-r-tetrahydrofurfuryl acrylate-r-trifluoroethyl acrylate);

polychlorotrifluoroethylene-g-poly(butyl acrylate-r-tetrahydrofurfuryl acrylate-r-perfluorooctyl acrylate);

polyvinylidene fluoride-g-poly(butyl acrylate);

polyvinylidene fluoride-co-(polychlorotrifluoroethylene-g-poly(butyl acrylate))-co-polytrifluoroethylene;

polyvinylidene fluoride-co-polychlorotrifluoroethylene-g-poly(butyl acrylate); and polychlorotrifluoroethylene-g-poly(butyl acrylate-r-hydroxybutylacrylate).

12. The composition of claim 1, wherein the copolymer includes polychlorotrifluoroethylene-g-poly(butyl acrylate) (PCTFE-g-P(BA)) represented by the following Formula 3a;

[Formula 3a]

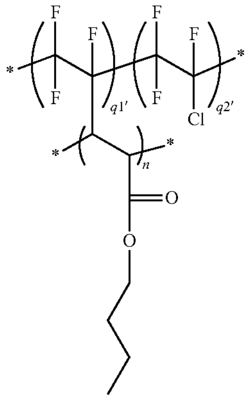

in Formula 3a, q1', q2', and n are the numbers of repeating units, wherein q1' is an integer of 1 to 300, q2' is an integer of 0 to 300, and n is an integer of 1 to 2,000.

13. The composition of claim 1, wherein the copolymer includes polyvinylidene fluoride-g-poly(butyl acrylate) (PVDF-g-P (BA)) represented by the following Formula 3b;

[Formula 3b]

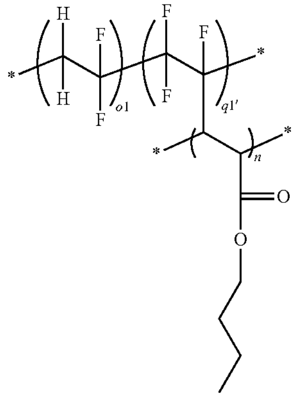

in Formula 3b, o1, q1', and n are the numbers of repeating units, wherein o1 is an integer of 1 to 400, q1' is an integer of 1 to 300, and n is an integer of 1 to 2,000.

* * * * *